(12) United States Patent
Tanabata

(10) Patent No.: US 9,323,700 B2
(45) Date of Patent: Apr. 26, 2016

(54) SEMICONDUCTOR INTEGRATED CIRCUIT AND DMA CONTROL METHOD OF THE SAME

(71) Applicant: SOCIONEXT INC., Yokohama, Kanagawa (JP)

(72) Inventor: Masatoshi Tanabata, Yokohama (JP)

(73) Assignee: Socionext Inc., Yokohama (JP)

( * ) Notice: Subject to any disclaimer, the term of this patent is extended or adjusted under 35 U.S.C. 154(b) by 257 days.

(21) Appl. No.: 13/770,645

(22) Filed: Feb. 19, 2013

(65) Prior Publication Data

US 2013/0262732 A1    Oct. 3, 2013

(30) Foreign Application Priority Data

Mar. 27, 2012 (JP) ................. 2012-071729

(51) Int. Cl.
  *G06F 13/28*  (2006.01)
  *G06F 13/36*  (2006.01)
  *G06F 13/376* (2006.01)

(52) U.S. Cl.
  CPC ............. *G06F 13/28* (2013.01); *G06F 13/36* (2013.01); *G06F 13/376* (2013.01)

(58) Field of Classification Search
  CPC . G06F 12/0835; G06F 12/1081; G06F 13/28; G06F 13/376; G06F 13/30; G06F 2213/28
  See application file for complete search history.

(56) References Cited

U.S. PATENT DOCUMENTS

| 5,212,795 | A  | * | 5/1993  | Hendry .......................... 710/28 |
| 6,412,027 | B1 | * | 6/2002  | Amrany et al. ................. 710/22 |
| 2004/0015621 | A1 | * | 1/2004  | Tanaka ........................... 710/22 |
| 2006/0129734 | A1 | * | 6/2006  | Kuo ............................. 710/308 |
| 2010/0312940 | A1 | * | 12/2010 | Shinohara ..................... 710/308 |

FOREIGN PATENT DOCUMENTS

| JP | 11-041297 A    | 2/1999  |
| JP | 1999-041287    | 2/1999  |
| JP | 2005-011287 A  | 1/2005  |
| JP | 2005-293435 A  | 10/2005 |
| JP | 2006-126938 A  | 5/2006  |
| WO | WO 2008/026273 A1 | 3/2008 |

OTHER PUBLICATIONS

Office Action of Japanese Patent Application No. 2012-071729 dated Oct. 26, 2015. (Full Machine Translation).

* cited by examiner

*Primary Examiner* — Tim T Vo
*Assistant Examiner* — Phong H Dang
(74) *Attorney, Agent, or Firm* — Arent Fox LLP

(57) ABSTRACT

A semiconductor integrated circuit includes a bus, a memory connected to the bus, an arithmetic processing unit connected to the bus, a first DMA controller connected to the bus, and at least one functional block connected to the bus. The functional block includes a functional macro which is configured to perform a process that realizes a given function, a second DMA controller which is configured to control data transfer between the memory and the functional macro, and an access condition setting unit which is configured to set an access condition regarding the DMA transfer between the memory and the functional macro.

9 Claims, 19 Drawing Sheets

SEMICONDUCTOR INTEGRATED CIRCUIT AND DMA CONTROL METHOD OF THE SAME

CROSS-REFERENCE TO RELATED APPLICATION

This application is based upon and claims the benefit of priority of the prior Japanese Patent Application No. 2012-071729, filed on Mar. 27, 2012, the entire contents of which are incorporated herein by reference.

FIELD

The embodiments discussed herein are related to a semiconductor integrated circuit and a DMA (Direct Memory Access) control method of the same.

BACKGROUND

In recent years, SoC (Silicon on Chip: semiconductor integrated circuit) is utilized in various electronic devices such as a digital still camera (DSC). By the way, following three are generally utilized as a data transfer scheme between respective functional macros (functional blocks, modules) of SoC.

A first data transfer scheme is a transfer by a CPU (Central Processing Unit) on SoC, and a second data transfer scheme is a DMA transfer by DMA controller (Direct Memory Access controller) on a system bus of SoC. In DMA transfer by DMA controller, each functional macro is DMA slave.

A third data transfer scheme performs DMA transfer by implementing a master circuit (DMA master) which performs DMA transfer into functional macro of SoC. In addition, other data transfer schemes are also proposed.

As mentioned above, various schemes such as first to third data transfer schemes are conventionally utilized as data transfer scheme between respective functional macros of SoC, but there are problems in these data transfer schemes as mentioned below.

In first data transfer scheme, the resource for main process to be performed by CPU is consumed since CPU controls data transfer, and therefore the process which CPU originally performs is prevented. In second data transfer scheme, since DMA controller connected to system bus of SoC controls data transfer between a plurality of functional macros, specification of DMA controller is complicated and period for a development is prolonged.

Problem of protraction of development period is come from a matter that, for example, at the time of defining specification of SoC, specification regarding DMA transfer for all functional macros and a priority of processes between all functional macros may have been determined.

Second data transfer scheme also includes a risk that, when using a quality of service (QoS) mechanism, hardware is more complicated, and when QoS mechanism does not suit an actual system operation, it is difficult to satisfy performance of processing speed. Furthermore, when developing another kind of product, there is inconvenience that there are few recyclable parts.

Third data transfer scheme also includes similar problems as second data transfer scheme mentioned above. In other words, transfer specification of DMA including software may be clear at the time of defining specification of SoC.

Third data transfer scheme includes a risk that, when using QoS mechanism, hardware is more complicated, and when QoS mechanism does not suit an actual system operation, it is difficult to satisfy performance of processing speed. Furthermore, when developing another kind of product, there is inconvenience that there are few recyclable parts.

By the way, various systems using a DMA controller are proposed conventionally.

In this regard, in the past, various types of a system employing a DMA controller have been proposed.

Patent Document 1: Japanese Laid-open Patent Publication No. 2005-011287
Patent Document 2: Japanese Laid-open Patent Publication No. H11-041297
Patent Document 3: International Publication Pamphlet No. WO 2008/026273

SUMMARY

According to an aspect of the embodiments, there is provided a semiconductor integrated circuit including a bus, a memory connected to the bus, an arithmetic processing unit connected to the bus, a first DMA controller connected to the bus, and at least one functional block connected to the bus.

The functional block includes a functional macro which is configured to perform a process that realizes a given function, a second DMA controller which is configured to control data transfer between the memory and the functional macro, and an access condition setting unit which is configured to set an access condition regarding the DMA transfer between the memory and the functional macro.

The object and advantages of the embodiments will be realized and attained by the elements and combinations particularly pointed out in the claims.

It is to be understood that both the foregoing general description and the following detailed description are exemplary and explanatory and are not restrictive of the embodiments, as claimed.

DESCRIPTION OF EMBODIMENTS

First, before explaining embodiments of a silicon on chip and a DMA control method of the silicon on chip in detail, a digital still camera as an example, to which the silicon on chip is applied, a data transfer scheme between respective functional macros (modules) of the silicon on chip, and problems will be described with reference to FIG. 1 through FIG. 6.

Figure 1:
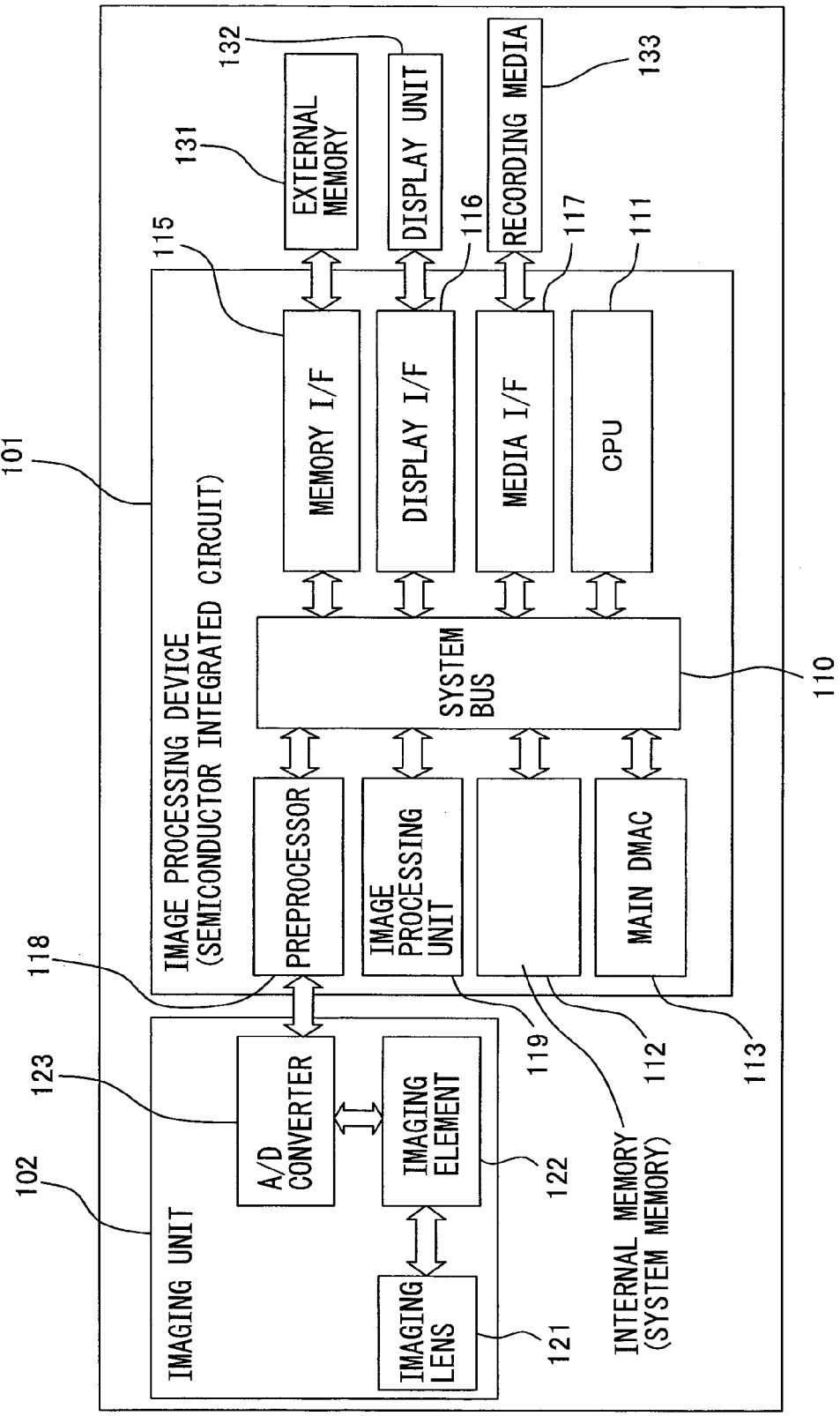
FIG. 1 is a block diagram depicting an example of a digital still camera to which a silicon on chip (SoC) is applied.

FIG. 1 is a block diagram depicting an example of a digital still camera to which a silicon on chip (SoC) is applied. In FIG. 1, a referential mark 101 indicates an image processing device (semiconductor integrated circuit, silicon on chip: SoC), 102 indicates an imaging unit, 131 indicates an external memory, 132 indicates a display unit, and 133 indicates a recording media.

The imaging unit 102 converts information on a photographic subject to a form that may be processed by the image processing device 101 and outputs the converted information. The imaging unit 102 includes an imaging lens 121, an imaging element 122, and an A/D converter 123. The imaging lens 121 outputs the information on the photographic subject to the imaging element 122 as an incident light.

The imaging element 122 converts the light input from the imaging lens 121 into an electrical signal (image data), and outputs the electrical signal to the A/D converter 123. As the imaging element 122, for example, an image sensor, such as CCD (Charge Coupled Device) and CMOS (Complementary Metal Oxide Semiconductor) is used.

The image processing device 101 processes the image data which is input from the imaging unit 102, and transfers data to respective functional macros (interface modules) 115 to 117. The image processing device 101 includes a system bus 110, a CPU (main CPU) 111, and an internal memory (system memory) 112.

The image processing device 101 further includes a main DMAC 113, a memory interface (I/F) 115, a display I/F 116, a media I/F 117, a preprocessor 118, and an image processing unit 119.

The system bus 110 is a shared bus for connecting respective modules in the image processing device 101. The main CPU 111 is a unit which controls respective circuits (modules) as a whole, and for example, performs a control such as an analysis of the data and the image, setting to each circuit based on the analysis result, and so on.

The internal memory 112 is a memory module arranged in the image processing device 101, and is used in order to hold the image data before a process and in the middle of the process, and so on. The main DMAC 113 is arranged in the image processing device 101, and transfers data between respective modules in the image processing device 101 in accordance with the setting from the CPU 111.

The memory I/F 115 is an interface module which arbitrates accesses to the external memory 131. The display I/F 116 converts the image data transmitted from the internal memory 112 and the external memory 131 into the data with a form suitable for the display unit 132, and outputs the converted data to the display unit 132. The media I/F 117 is a module which performs a data input/output to the recording media 133.

The preprocessor 118 receives the image data from the A/D converter 123 of the imaging unit 102, processes the image data in accordance with the instruction from the CPU 111, and stores the processed data in the internal memory 112 or the external memory 131. The image processing unit 119 converts the image data in the internal memory 112 or the external memory 131 into a given format (such as JPEG).

The external memory 131 is a memory provided outside the image processing device 101. For example, a memory, such as SDRAM/DDR (Synchronous Dynamic Random Access Memory/Double-Data-Rate) or the like is used as the external memory 131. The display unit 132 is a unit which displays the image data processed in the image processing device 101. A liquid crystal display or the like is used as the display unit 132.

The recording media 133 is an external recording device for storing the image data processed in the image processing device 101. A portable memory card, such as CompactFlash (CF) (registered trademark) card and SD (registered trademark) card, is used as the recording media 133.

Figure 2:
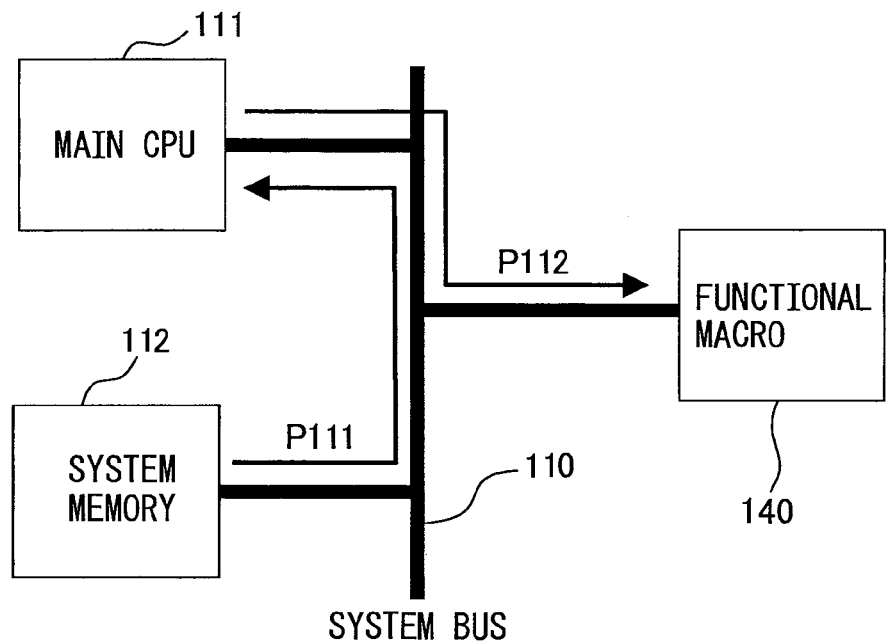
FIG. 2 is a block diagram for illustrating a first example of a data transfer scheme in a silicon on chip.

FIG. 2 is a block diagram for illustrating a first example of a data transfer scheme (a first data transfer scheme) in a silicon on chip. It depicts a scheme in which the main CPU 111 transfers the data in the system memory (memory) 112 to the functional macro (for example, encryption macro) 140. As for the functional macro (functional block) 140, it is needless to say that it is not limited to the encryption macro. Here, each of the functional macro, the functional block, and the functional module is a circuit which is included in the semiconductor integrated circuit and which performs a process that realizes a given function.

As depicted in FIG. 2, the data in the system memory 112 is once stored in a register in the main CPU 111 (arithmetic processing unit) through the system bus (bus) 110 (path (process) P111). Then, the data stored in the register in the main CPU 111 is written in the functional macro 140 through the system bus 110 (P112).

In the data transfer scheme depicted in FIG. 2, the process of the main CPU 111 stops for data transfer, and a unit of data transfer is restricted to, for example, a bus width of the main CPU 111, and therefore, the unit of data transfer is relatively small (32 bits/64 bits). This results in a problem that the process of the main CPU 111 is delayed or that a data transfer rate is lowered.

Figure 3:
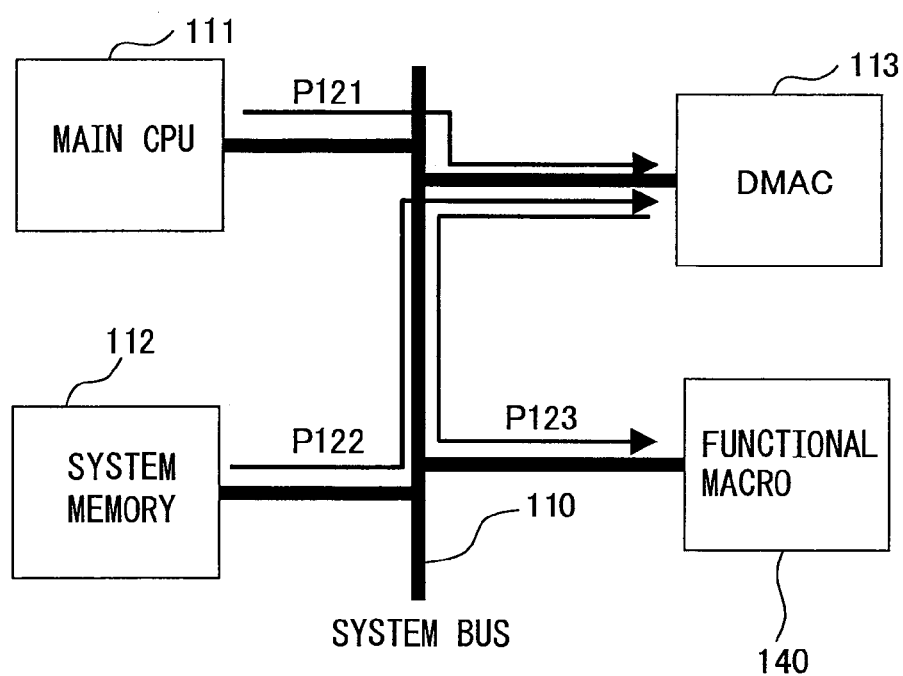
FIG. 3 is a block diagram for illustrating a second example of a data transfer scheme in a silicon on chip.

FIG. 3 is a block diagram for illustrating a second example of a data transfer scheme (a second data transfer scheme) in a silicon on chip. It depicts a scheme in which the DMAC (main DMAC) 113 on the system bus 110 transfers the data in the system memory 112 to the functional macro 140.

As depicted in FIG. 3, the main CPU 111 outputs a transfer request to the DMAC 113 (P121), and the DMAC 113 reads, in response to the transfer request, data (transfer data) from the system memory 112 (P122). Furthermore, the DMAC 113 writes the read data in the functional macro 140 (P123).

The DMAC 113 may process at once the transfer data size larger than the size processed by the main CPU 111, such as 512 bits, and therefore high-speed data transfer may be performed and transfer efficiency may be improved. Furthermore, since the data transfer is performed by the DMAC 113, the process of the main CPU 111 may not be stopped.

However, in the data transfer scheme depicted in FIG. 3, since the DMAC 113 controls the data transfer between a plurality of functional macros (the functional macro 140 and the functional macros 115 to 117 in FIG. 1 and so on), the specification of the DMAC 113 is complicated and the period for a development is prolonged.

The problem of protraction of the development period is come from a matter that, for example, at the time of defining the specification of the silicon on chip (SoC), the specification regarding the DMA transfer for all functional macros and a priority of the process between all functional macros may have been determined.

The data transfer scheme depicted in FIG. 3 also includes a risk that, when implementing a quality of service (QoS) mechanism, the hardware is more complicated, and when the QoS mechanism does not suit an actual system operation, it is difficult to satisfy performance of processing speed. Furthermore, when developing another kind of product, there is inconvenience that there are few recyclable parts.

Figure 4:
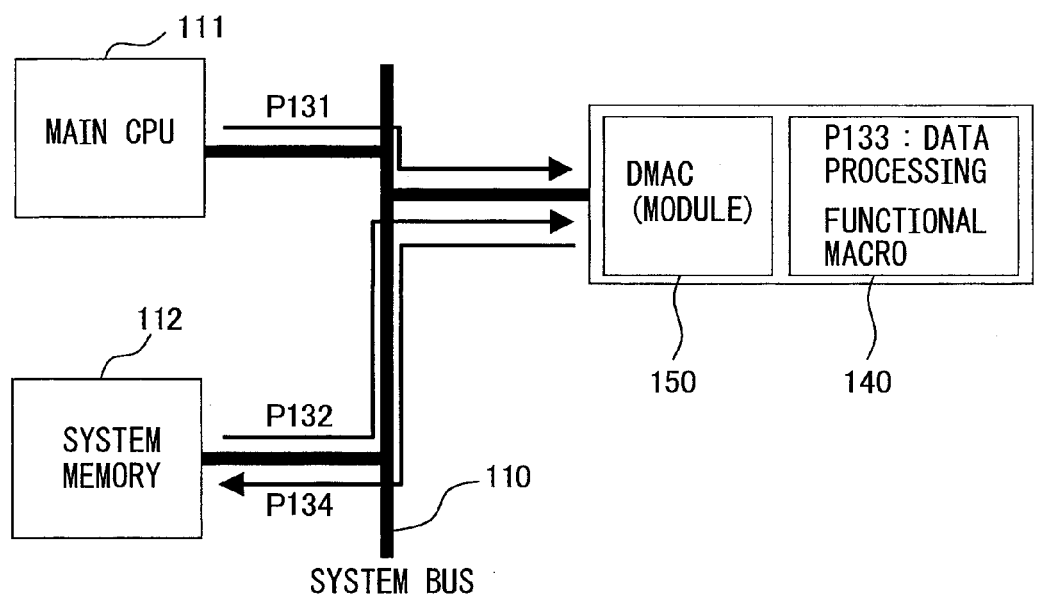
FIG. 4 is a block diagram for illustrating a third example of a data transfer scheme in a silicon on chip.

FIG. 4 is a block diagram for illustrating a third example of a data transfer scheme (a third data transfer scheme) in a silicon on chip. It depicts a scheme in which the DMAC (module) 150) is included in the functional macro 140 as an interface and the DMAC 150 transfers the data.

As depicted in FIG. 4, the main CPU 111 outputs the transfer request to the DMAC 150 provided for the functional macro 140 (P131), and the DMAC 150 reads, in response to the transfer request, data (transfer data) from the system memory 112 (P132).

The data read by the DMAC 150 is processed by the functional macro 140 (P133), and then the processed data is written in the system memory 112 through the DMAC 150 (P134).

Since the DMAC 150 may process at once larger transfer data size as is the case in the DMAC 113 of FIG. 3 mentioned above, transmission efficiency may be improved, and the process of the main CPU 111 may not be stopped.

Figure 5:
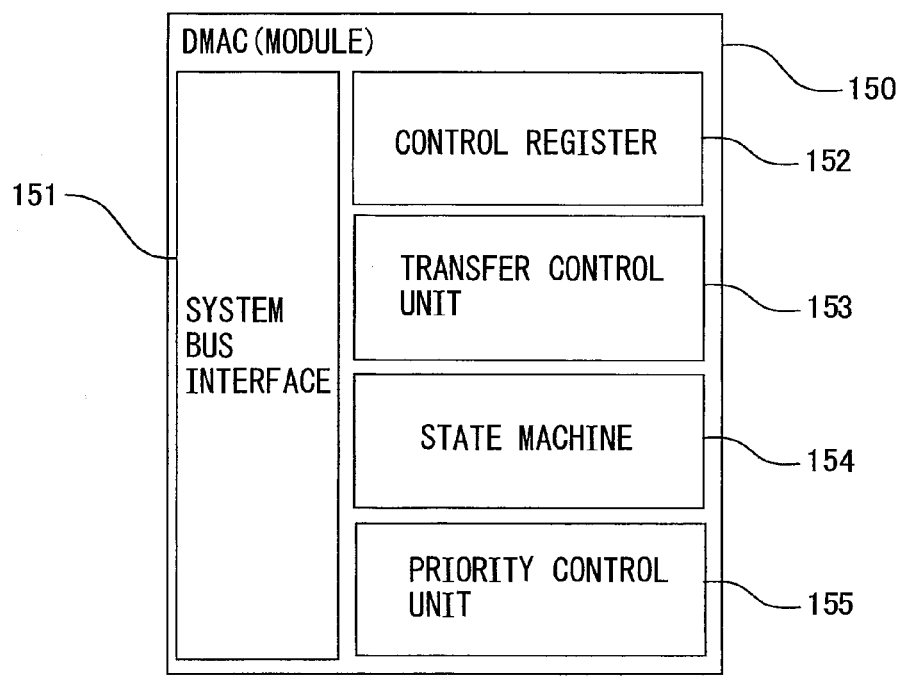
FIG. 5 is a block diagram depicting an example of a DMAC (module) in FIG. 4.

FIG. 5 is a block diagram depicting an example of a DMAC (module) in FIG. 4. As depicted in FIG. 5, the DMAC 150 includes, for example, a system bus interface 151, a control register 152, a transfer control unit 153, a state machine 154, and a priority control unit 155.

The system bus interface 151 is a circuit for interfacing between the system bus 110 and the functional macro 140 (DMAC 150). The control register 152 is a control register for performing the DMA transfer by the transfer control unit 153.

The state machine 154 is a logic circuit (sequence circuit) which determines a subsequent state according to an input condition and a current state. The priority control unit 155 is for controlling the QoS mechanism. The state machine 154 and the priority control unit 155 are made by hardware.

Also in the data transfer schemes depicted in FIG. 4 and FIG. 5 mentioned above, since data is transferred in a suitable form for the contents of process of the functional macro which processes the data, the transfer channel of the DMAC 150 increases according to the number of functions of macro.

Moreover, as is the case with the illustration with reference to FIG. 3, also in the data transfer scheme depicted in FIG. 4 and FIG. 5, there are a problem of protraction of the development period and a problem of the complexity of the hardware when implementing the QoS mechanism.

In other words, there is a risk that the hardware of the state machine 154 and the priority control unit 155 enlarges, and when the QoS mechanism does not suit an actual system operation, it is difficult to satisfy performance of processing speed. Furthermore, when developing another kind of product, there is inconvenience that there are few recyclable parts.

Figure 6:
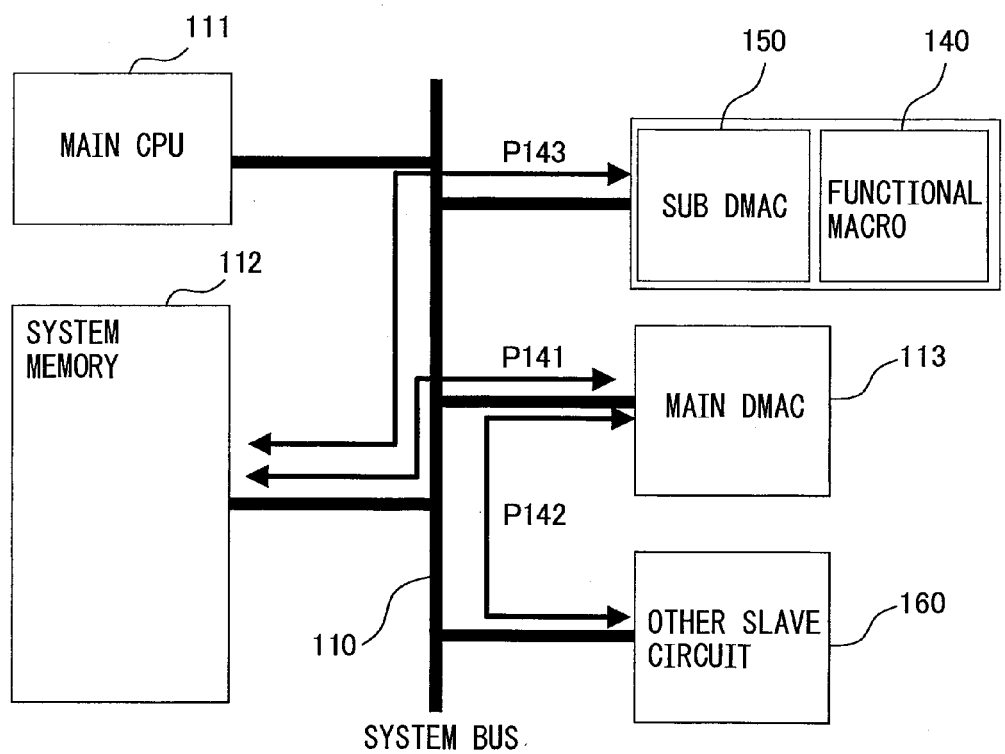
FIG. 6 is a block diagram for illustrating a fourth example of a data transfer scheme in a silicon on chip.

FIG. 6 is a block diagram for illustrating a fourth example of a data transfer scheme in a silicon on chip. The data transfer scheme depicted in FIG. 6 includes the main DMAC (DMAC) 113 for the system bus 110, and the sub DMAC 150 for the functional macro 140. The sub DMAC 150 corresponds to the DMAC (module) of FIG. 4 mentioned above, and the main DMAC 113 corresponds to the DMAC of FIG. 3. Note that, FIG. 6 simplifies and depicts the transfer request and the data transfer.

The main DMAC 113 controls the DMA transfer between the system memory 112 and other slave circuit 160 (main CPU 111) through the main DMAC 113 in accordance with the transfer request from the main CPU 111 (P141, P142). The sub DMAC 150 controls the DMA transfer between the functional macro 140 and the system memory 112 in accordance with the transfer request from the main CPU 111 (P143).

Although the data transfer scheme depicted in FIG. 6 provides the DMAC (main DMAC) 113 of FIG. 3, and the DMAC (sub DMAC) 150 of FIG. 4 as mentioned above, there is also problems similar to the problems in the data transfer scheme of FIG. 4 and FIG. 5 mentioned above.

More specifically, when a new network function (functional macro 140) is implemented for the silicon on chip 101 illustrated with reference to FIG. 1, the main DMAC 113 controls the DMA transfer of other slave circuit (other functional macros 115 to 117) 160 on the system bus 110. The sub DMAC 150 controls the DMA transfer of the network function macro 140 on the system bus 110.

For example, the DMA transfer process by the main DMAC 113 and the DMA transfer process by the sub DMAC 150 may conflict. Specifically, the DMA transfer processes by the main DMAC 113 is a process (DMA transfer process at the time of photographing) which writes the image data input from the imaging unit 102 into the system memory 112 from the preprocessor 118, for example. Moreover, the DMA transfer process by the sub DMAC 150 is a data transfer process by the network function macro 140, for example.

In this case, for example, it is preferred to continuously perform the DMA transfer processes at the time of photographing by the main DMAC 113 with top priority, and to provide a function of stopping the data transfer processing of the network function macro 140 by the sub DMAC 150 to avoid the conflict.

In order to realize such constitution, for example, hardware for checking the operation status of the main DMAC 113 or the system bus 110 is additionally implemented to the sub DMAC 150. In this case, for example, as is the case when implementing the above-mentioned QoS mechanism, problem of enlargement of a hardware scale and problem of the protraction of hardware implementation period due to the addition of the dedicated logic circuit will occur.

Furthermore, when the QoS mechanism does not suit an actual system operation, it is difficult to satisfy performance of processing speed, and when developing another kind of product, there are few recyclable parts. This will be more remarkable, for example, when designing in consideration of an increase of the number of transfer channels, or the influence on the connected system.

In some specifications, there may be a case in which the DMA transfer process by the main DMAC 113 at the time of photographing is stopped and the data transfer processing of the network function macro 140 by the sub DMAC 150 is performed continuously with top priority. However, similar problems may occur.

Figure 7:
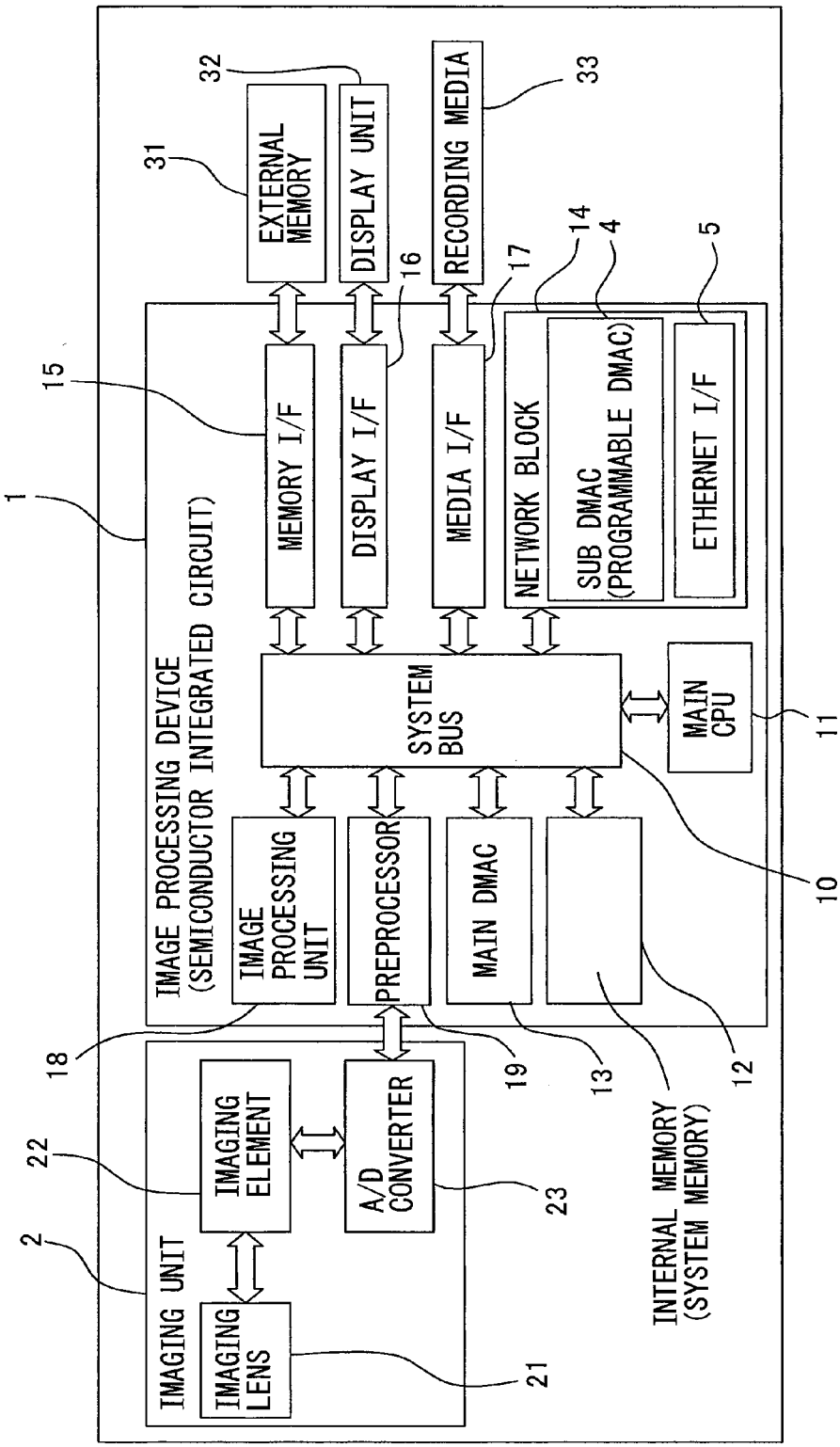
FIG. 7 is a block diagram depicting an example of a digital still camera, to which a silicon on chip (SoC) according to the present embodiment is applied.

Below, embodiments of a silicon on chip (SoC: semiconductor integrated circuit) and a DMA (Direct Memory Access) control method of the same will be explained in detail with reference to the accompanying drawings. FIG. 7 is a block diagram depicting an example of a digital still camera, to which a silicon on chip (SoC) according to the present embodiment is applied. FIG. 7 corresponds to the camera in which a network block (functional block) 14 is added to the silicon on chip (image processing device: SoC) 101 mentioned above.

Although FIG. 7 depicts the network block as an example of the functional block 14 in which the sub DMAC (programmable DMAC) 4 and the Ethernet (registered trademark) interface (I/F) 5 are provided, the embodiments are not limited to such constitution. Furthermore, it is not limited to one functional block 14 in which the sub DMAC 4 is provided. For example, two or more functional blocks 14 may be provided, as mentioned below with reference to FIG. 16.

As depicted in FIG. 7, the digital still camera includes an image processing device (silicon on chip: SoC) 1, an imaging unit 2, an external memory 31, a display unit 32, and a recording media 33.

The imaging unit 2 converts information on the photographic subject to a form that may be processed by the image processing device 1 and outputs the converted information. The imaging unit 2 includes an imaging lens 21, an imaging element 22, and an A/D converter 23. The imaging lens 21 output the information on the photographic subject to the imaging element 22 as an incident light.

The imaging element 22 converts the light input from the imaging lens 21 into an electrical signal (image data), and outputs the electrical signal to the A/D converter 23. As the imaging element 22, an image sensor, such as CCD and CMOS is used, for example.

The image processing device 1 processes the image data which is input from the imaging unit 2, and transfers data to respective interface modules 15 to 17. The image processing device 1 includes a system bus 10, a CPU (main CPU) 11, and an internal memory (system memory) 12.

The image processing device 1 further includes a main DMAC (first DMA controller) 13, a network block 14, a memory I/F 15, a display I/F 16, a media I/F 17, a preprocessor 18, and an image processing unit 19.

The network block 14 includes a sub DMAC (second DMA controller) 4 and an Ethernet (registered trademark) I/F (functional macro) 5. The sub DMAC 4 will be illustrated in detail below with reference to FIG. 8 and subsequent drawings.

The system bus 10 is a shared bus for connecting respective modules in the image processing device 1. The main CPU 11 is a unit which controls respective circuits (modules) as a whole, and for example, performs a control such as an analysis of the data and the image, setting to each circuit based on the analysis result, and so on.

The internal memory 12 is a memory module arranged in the image processing device 1, and is used in order to hold the image data before a process and in the middle of the process, and so on. The main DMAC 13 is arranged in the image processing device 1, and transfers data between respective modules in the image processing device 1 in accordance with the setting from the CPU 11.

The memory I/F 15 is an interface module which arbitrates accesses to the external memory 31. The display I/F 16 converts the image data transmitted from the internal memory 12 and the external memory 31 into the data with a form suitable for the display unit 32, and outputs the converted data to the display unit 32. The media I/F 17 is a module which performs a data input/output to the recording media 33.

The preprocessor 18 receives the image data from the A/D converter 23 of the imaging unit 2, processes the image data in accordance with the instruction from the CPU 11, and stores the processed data in the internal memory 12 or the external memory 31. The image processing unit 19 converts the image data in the internal memory 12 or the external memory 31 into a given format (such as JPEG).

The external memory 31 is a memory provided outside the image processing device 1. For example, a memory, such as SDRAM/DDR or the like is used as the external memory 31. The display unit 32 is a unit which displays the image data processed in the image processing device 1. A liquid crystal display or the like is used as the display unit 32.

The recording media 33 is an outside recording device for storing the image data processed in the image processing device 1. A portable memory card, such as CompactFlash (registered trademark) (CF card) and SD (registered trademark) card, is used as the recording media 33.

Figure 8:
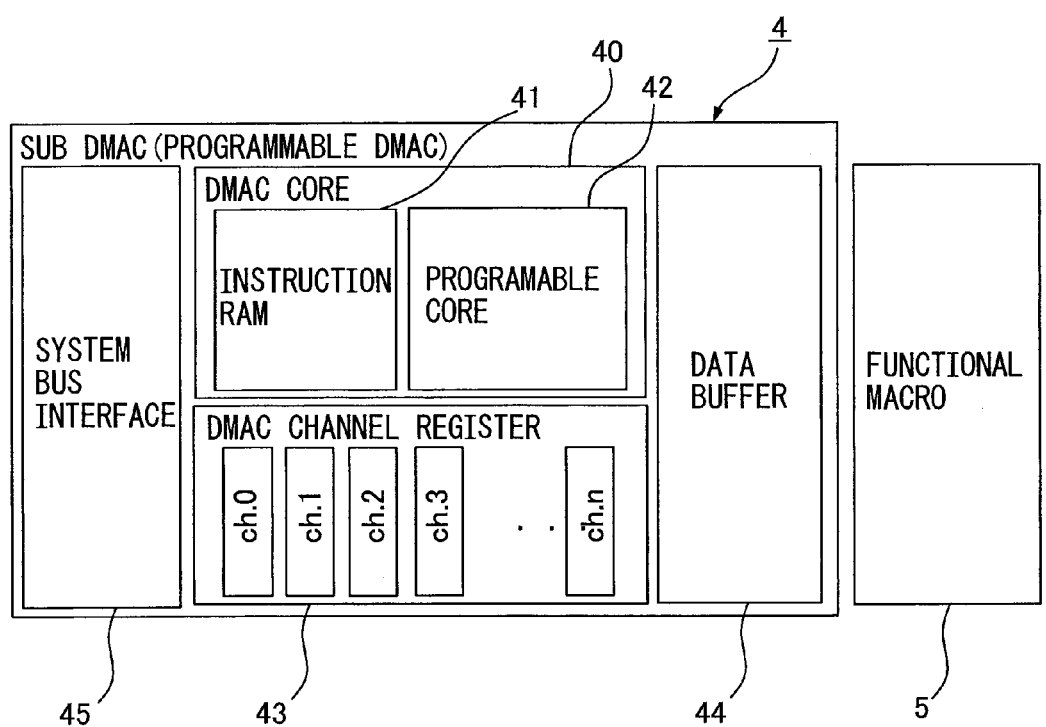
FIG. 8 is a block diagram depicting an example of a sub DMAC (programmable DMAC) in a silicon on chip depicted in FIG. 7.

FIG. 8 is a block diagram depicting an example of a sub DMAC (programmable DMAC) in a silicon on chip depicted in FIG. 7. As depicted in FIG. 8, the sub DMAC 4 is connected to the functional macro 5, and the sub DMAC 4 includes a DMAC core 40, a DMAC channel register 43, a data buffer 44, and a system bus interface 45.

The DMAC core 40 includes an instruction RAM 41 and a programmable core 42. The DMAC channel register 43 includes a plurality of (n+1 pieces of) registers CH.0 to CH.n which holds the data for performing the DMA transfer.

The programmable core 42 controls the DMA transfer in accordance with a program (instructions) loaded to the instruction RAM 41. Moreover, each register of the DMAC channel register 43 includes, for example, an address register, a transfer request register, a quality of service register and so on.

The instruction RAM (instruction memory, control code storing unit) 41 and the DMAC channel register (register) 43 correspond to an access condition setting unit which sets an access condition regarding the DMA transfer between the system memory 12 and the functional macro 5.

The address registers are registers for storing the address of the system memory (memory) 12. The transfer request registers are registers for instructing the data to be processed to the sub DMAC 4. The quality of service registers are registers for performing a setting at the time of QoS control. A timer used for an interrupt command may be provided in the sub DMAC 4.

Unlike the DMAC (module) 150 illustrated with reference to FIG. 5, the sub DMAC 4 of the present embodiment depicted in FIG. 8 executes the program loaded to the instruction RAM 41 by the programmable core 42, whereby performing the DMA transfer according to the system.

Specifically, regarding the QoS control, the sub DMAC 4 may be compatible with systems with a support of a round-robin mechanism only, weighted round-robin (WRR)+round-robin, highest priority transfer queue+round-robin, or without quality of service.

In other words, according to the present embodiment, since the QoS control is implemented by dedicated codes loaded to the instruction RAM 41, it is possible to flexibly modify a system according to various QoS control systems as mentioned above, and for example, it is possible to adjust the system while checking an actual system operation.

For example, in the silicon on chip illustrated with reference to FIG. 1 to FIG. 6, since the control of such various QoS control systems is realized by implementing the state machine by hardware, modification of the QoS control system needs a modification of the hardware. On the other hand, according to the present embodiment, modification of the dedicated codes loaded to the instruction RAM 41 allows a flexible modification for various QoS control systems.

Figure 9:
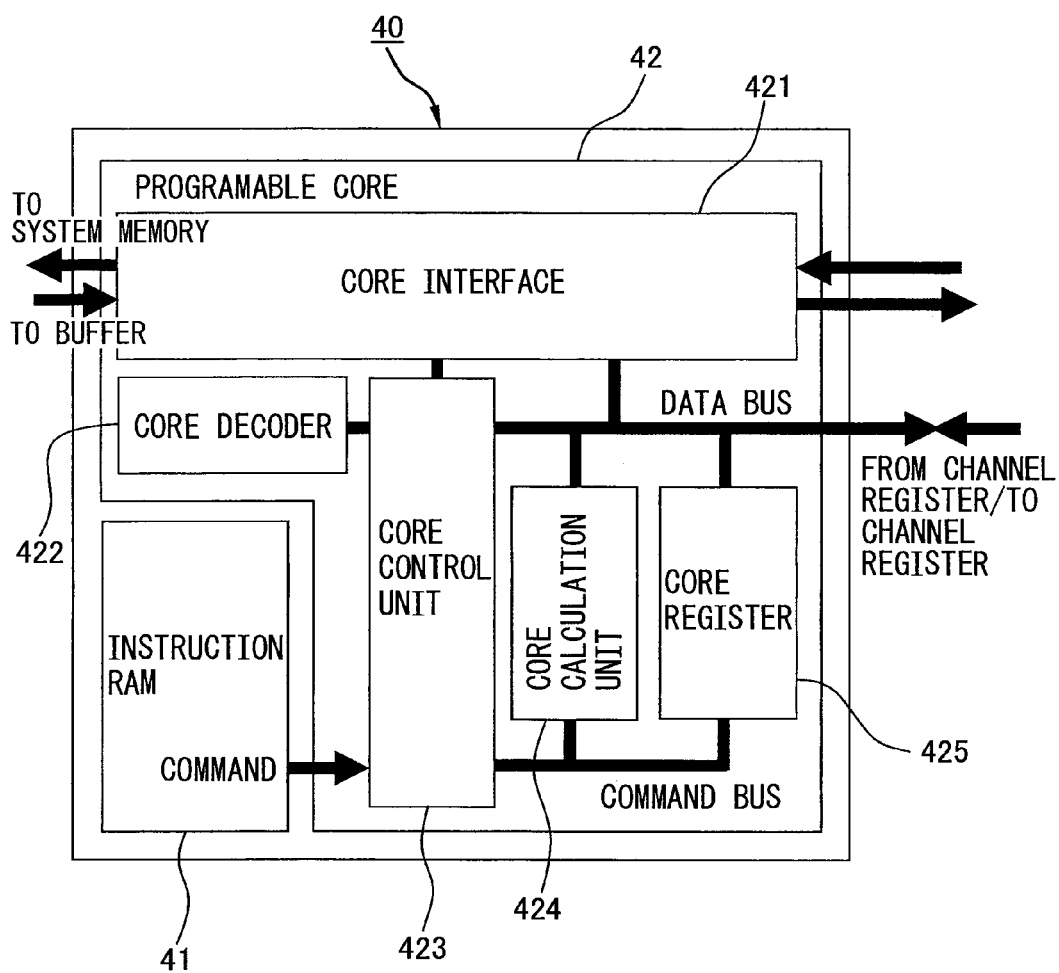
FIG. 9 is a block diagram depicting an example of a programmable core in a sub DMAC depicted in FIG. 8.

FIG. 9 is a block diagram depicting an example of a programmable core in a sub DMAC depicted in FIG. 8. In FIG. 9, a referential mark 421 indicates a core interface, 422 indicates a core decoder, 423 indicates a core control unit, 424 indicates a core calculation unit, and 425 indicates a core register.

As depicted in FIG. 9, the programmable core 42 includes the core interface 421, the core decoder 422, the core control unit 423, the core calculation unit 424, and the core register 425.

The instruction RAM 41 includes a RAM area which stores the dedicated codes (control codes), and loads the cords, which are designed to satisfy the specification of the DMA, for example, at the time of initialization when power on the system and so on.

The core interface 421 accesses to outside the programmable core 42 in accordance with a command, such as commands for a copy, read-out and write, from the instruction RAM 41.

The core decoder 422 decodes the command from the instruction RAM 41. The core control unit 423 controls the core interface 421, the core calculation unit 424 and the core register 425 in accordance with the decoded command.

The core calculation unit 424 executes various operation instructions (for example, addition, subtraction, logical product and so on). The core register 425 is a register in which registers capable of access using a cord are integrated, and includes a general register used for holding data, and a dedicated register in which the setting value itself has a meaning.

The DMAC core 40 (programmable core 42) is connected, for example, through a bus (internal bus) to the DMAC channel registers 43 in which a register used for the DMA transfer is implemented. Moreover, the DMAC core 40 may load the data in the DMAC channel register 43 using the command stored in the instruction RAM 41, or store the data in the DMAC channel register 43.

Providing the programmable core 42 as depicted in FIG. 9 allows a store of various parameters (such as a host address and transfer data size) which are used at the time of the DMA transfer, using the dedicated cords in internal core register 425, and allows a use of the parameters.

Furthermore, providing, in the core register 425, the register managing the address which is used when accessing the system memory 12 (host) allows a control by the dedicated codes.

Accordingly, it is possible to describe a series of processes used at the time of DMA transfer operation with a software resource of the dedicated cords. In other words, the processes may be controlled by the cords stored in the instruction RAM 41.

As for the instruction RAM 41, for example, given cords (commands) are loaded by the main CPU (arithmetic processing unit) 11, when power on the silicon on chip (SoC) 1 or an electronic device with the SoC 1.

In the above, rewriting the data (control codes to be loaded) stored in the instruction RAM 41 allows various modification of the access condition regarding the DMA transfer between the system memory 12 controlled by the sub DMAC 4 and the functional macro 5. This allows a modification of the specification, a firmware update and so on, after applying the SoC (silicon on chip) to, for example, the digital still camera (product).

Figure 10:
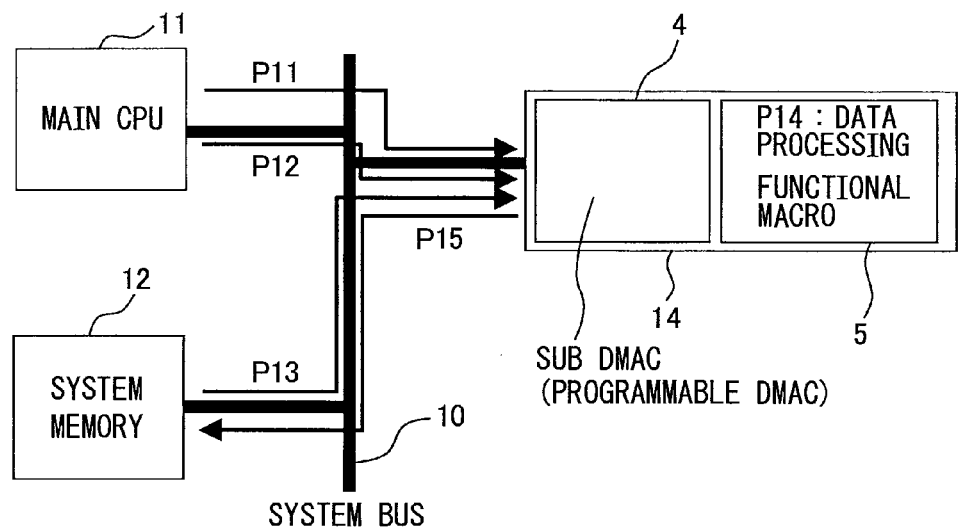
FIG. 10 is a block diagram for illustrating an example of a data transfer scheme in a silicon on chip of a first embodiment.

FIG. 10 is a block diagram for illustrating an example of a data transfer scheme in a silicon on chip of a first embodiment. Note that, FIG. 10 omits the main DMAC (13) and other slave circuit (15').

As depicted in FIG. 10, for example, the main CPU 11 writes the dedicated cords in the sub DMAC 4 (instruction RAM 41) at the time of power on (P11). The writing of the dedicated cords to the sub DMAC 4 by the main CPU 11 is only performed, for example at the time of initialization when power on the device or the like as mentioned above.

The main CPU 11 outputs a transfer request to the sub DMAC 4 (P12), and the sub DMAC 4 reads data (transfer data) from the system memory 12 (P13) in response to the transfer request.

The data read by the sub DMAC 4 is processed by the functional macro 5 therein (P14), and then, the processed data is written in the system memory 12 through the sub DMAC 4 (P15).

After the sub DMAC 4 reads the dedicated cords at the time of initialization, for example, operations of P13 to P15 are repeated in accordance with the transfer request (P12) from the main CPU 1. Since the sub DMAC 4 may process at once larger transfer data size as is the case in the main DMAC 13, data transmission efficiency may be improved, and the process of the main CPU 11 may not be stopped.

Figure 11:
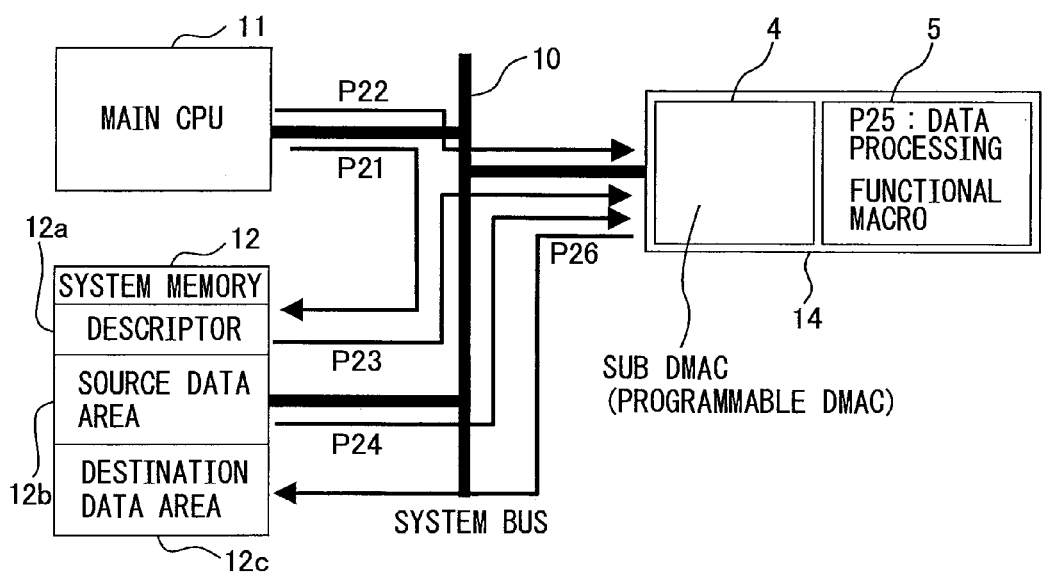
FIG. 11 is a block diagram for illustrating another example of a data transfer scheme in a silicon on chip of a first embodiment.

FIG. 11 is a block diagram for illustrating another example of a data transfer scheme in a silicon on chip of a first embodiment. The sub DMAC is made hard-wired (circuit connection). As depicted in FIG. 11, the main CPU 11 arranges a descriptor 12a on the system memory 12 (P21).

The descriptor 12a arranged on the system memory 12 includes, for example, information such as 0x0: data transfer size, 0x4: source address, and 0x8: destination address. The system memory 12 further includes a source data area 12b and a destination data area 12c.

When the main CPU 11 outputs a process request to the sub DMAC 4 in the functional block 14 (P22), the sub DMAC 4 reads the descriptor 12a (P23). The sub DMAC 4 transfers the data (DMA transfer) from the system memory 12 to the functional macro 5 in accordance with the information of the descriptor 12a (P24).

Then, a given data processing is applied to the data in the functional macro 5 (P25), and the sub DMAC 4 transfers the processed data to the system memory 12 in accordance with the descriptor 12a (P26).

In these processes, the main CPU 11 only performs the processes of P21 and P22 mentioned above, and subsequent processes (P23, P24, and P26) may be performed by the sub DMAC 4. Therefore, it is possible to reduce resource consumption of the main CPU 11.

Figure 12:
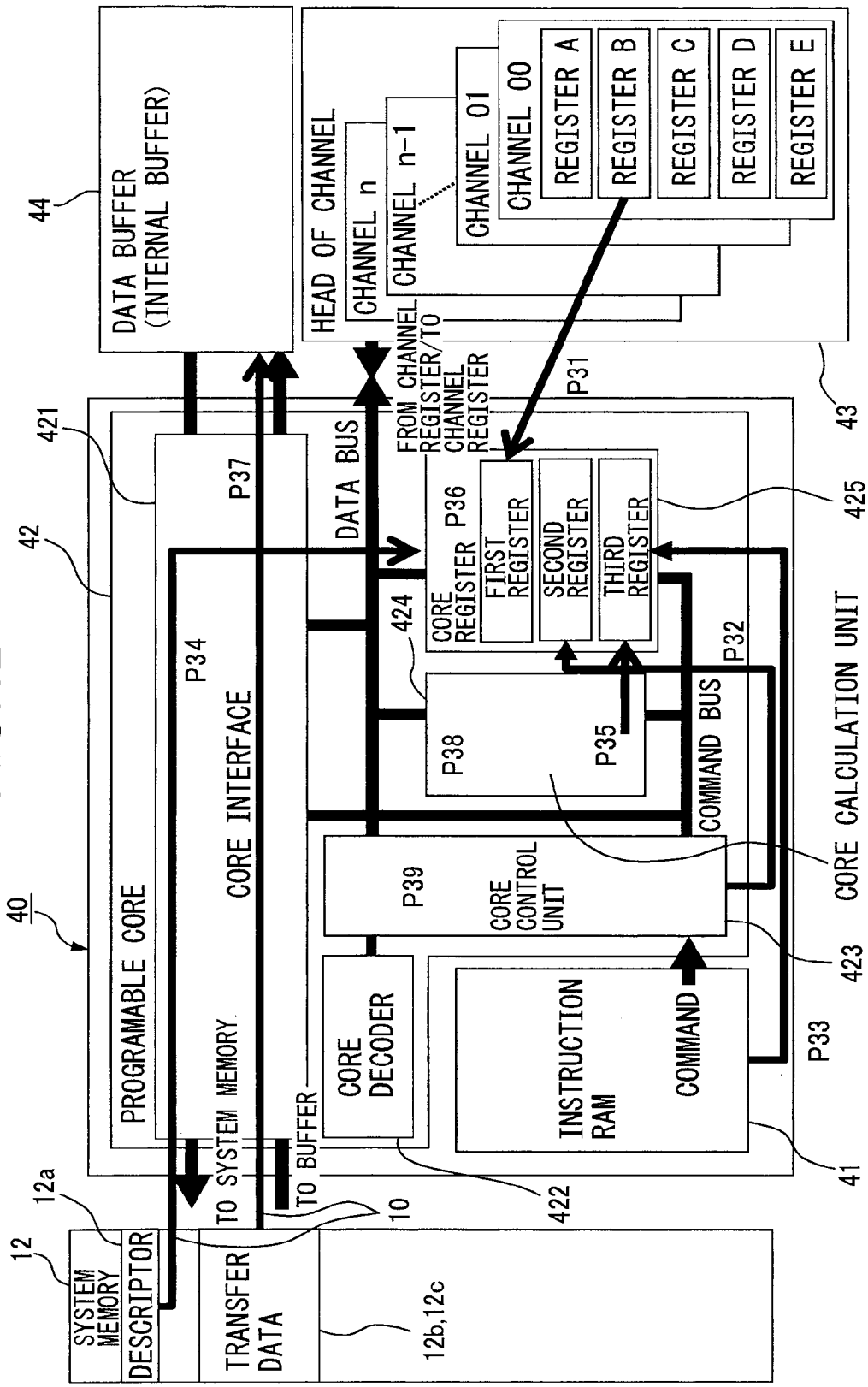
FIG. 12 is a block diagram for illustrating an example of processes at the time of resource competition in a silicon on chip of a first embodiment paying attention to a sub DMAC.

FIG. 12 is a block diagram for illustrating an example of processes at the time of resource competition in a silicon on chip of a first embodiment paying attention to the sub DMAC 4. FIG. 12 depicts the processes after the main CPU 11 outputs DMA transfer instructions to the sub DMAC (programmable DMAC) 4.

In other words, FIG. 12 is for illustrating the processes of P23 and P24 in FIG. 11, and the processes (P31 to P39) depicted in FIG. 12 are performed in accordance with the control codes (dedicated cords) loaded to the instruction RAM 41, for example, at the time of initialization when the system power on or the like.

FIG. 12 depicts the DMAC core 40 (the instruction RAM 41 and the programmable core 42), the DMAC channel register 43, and the data buffer (internal buffer) 44, which are illustrated with reference to FIG. 8 and FIG. 9, with the system memory 12. Note that the whole procedure of the data transfer by the sub DMAC 4 is similar to the procedure illustrated with reference to FIG. 11.

As depicted in FIG. 12, for example, the data (start address) in the register B of the channel 00 in the DMAC channel register 43 is loaded to a first register of the core register 425 (P31).

Next, a buffer address (constant value on the instruction RAM 41) is loaded, by the core control unit 423, to a second register of the core register 425 (P32). Furthermore, the number of words of the descriptor 12a which is the constant value on the second register of the core register 425 is loaded to a third register of the core register 425 (P33). Accordingly, for example, the data for 3 words of 0x0 to 0x8 mentioned above is stored in the third register of the core register 425.

The data of the descriptor 12a with a third register setting words is read to the core register 425 (internal register) from a register indicated by the first register of the core register 425 (P34). Accordingly, for example, the data of 3 words (0x0: data transfer size, 0x4: source address, 0x8: destination address) is stored in the internal register.

Moreover, for example, the number of times of block copy issue is calculated based on the data transfer size (0x0) read in the process P34, and is stored (overwritten) in the third register of the core register 425 (P35).

Furthermore, the source address (0x4) read in the process P34 is loaded to the first register of the core register 425 (P36). Then, the block copy (block transfer of the data by the DMA) is performed (P37).

P38 depicts a process which subtracts 1 from the number of times of issue calculated in the process P35 by the core calculation unit 424. P39 depicts a process which jumps to the process P34 when the number of times of copy command issue is not equal to 0 (≠0).

In this way, according to the present embodiment, for example, a part relating to parameters, such as the address of the system memory (host) used for the DMA transfer and data size to be transferred, is controlled not only by the hard-wired but also by the control codes (commands) on the instruction RAM 41.

This allows an access in a unit of instruction, and, by combining with another branch instruction or operation instruction, a fine adjustment of the transfer data size, an adjustment of the transfer timing and the like may be realized without any change of the hardware (circuit).

Next, the processes at the time of resource competition of the main DMAC 13 and the sub DMAC 4 will be illustrated.

First processes at the time of resource competition change the operation of the sub DMAC 4 by checking an operation status of the main DMAC 11, without preventing the transfer of the main DMAC 13. Moreover, second processes at the time of resource competition determine a use status of the system bus (bus) 10 using an embedded timer, for example.

The above-mentioned first processes at the time of resource competition will be hereinafter illustrated in detail with reference to FIG. 13 to FIG. 15 (FIG. 13 to FIG. 18), and the above-mentioned second processes at the time of resource competition is illustrated in detail later with reference to FIG. 13 and FIG. 19 to FIG. 22.

As a premise for the first processes at the time of resource competition, an address of a status register in the main DMAC 13, the address being stored in the system memory 12, is set in advance to the sub DMAC 4 (for example, the first register of the core register 425). Then, the processes at the time of resource competition are performed by changing the code loaded to the instruction RAM 41 of the sub DMAC 4 (DMAC core 40).

In this case, for example, the register for unused channel in the channel register 43 of the sub DMAC 4 is utilized, or the address of the status register in the main DMAC 13 is directly described to the code loaded to the instruction RAM 41.

Specifically, for example, the data in the register B of the channel register 43 is loaded to the first register of the core register 425, or is directly loaded to the first register of the core register 425 from the system memory 12.

Then, the data which the first register indicates is read into the second register of the core register 425, and the value of the first register is checked (conditional branch command). When conditions are satisfied, the address of the status register in the main DMAC 13 is loaded to the first register, and when the conditions are not satisfied, a process in accordance with a transfer process code is performed.

In other words, the first processes at the time of resource competition add a control code without modifying the hardware, and checks a status of the module such as the main DMAC 13 which exists on a memory map, and therefore, operation timing of the sub DMAC 4 may be changed.

Figure 13:
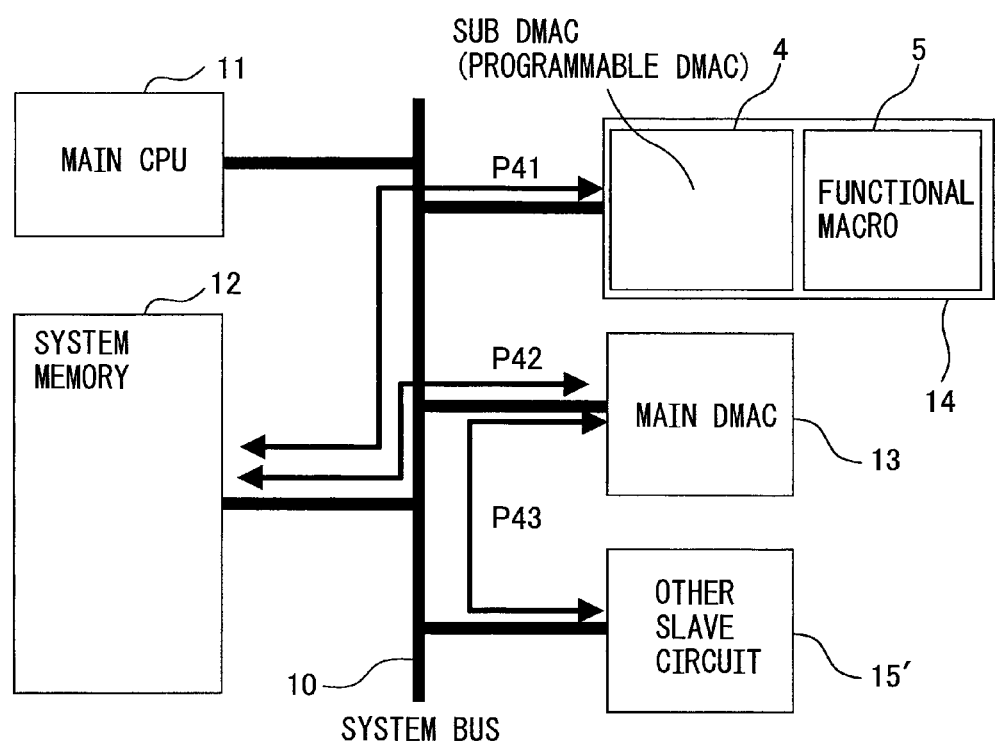
FIG. 13 is a block diagram for illustrating an example of processes at the time of resource competition in a silicon on chip of a first embodiment paying attention to entire silicon on chip.

FIG. 13 is a block diagram for illustrating an example of processes at the time of resource competition in a silicon on chip of a first embodiment paying attention to entire silicon on chip.

FIG. 13 corresponds to the silicon on chip in which the main DMAC 13 and another slave circuit 15' are clearly depicted to the above-mentioned silicon on chip depicted in FIG. 10 or FIG. 11. In FIG. 13, a referential mark P41 depicts a DMA transfer process by the sub DMAC 4, and P42 and P43 depict a DMA transfer process by the main DMAC 13.

By the way, for example, data size (TC (Transfer Count) field at the time of DMA transfer is exemplified as status information of the main DMAC 13. For example, when the main DMAC 13 includes the TC field and the TC field indicates a value other than zero during the DMA transfer, it is possible to check the operation state of the main DMAC 13 by referring to the TC field.

Figure 14:
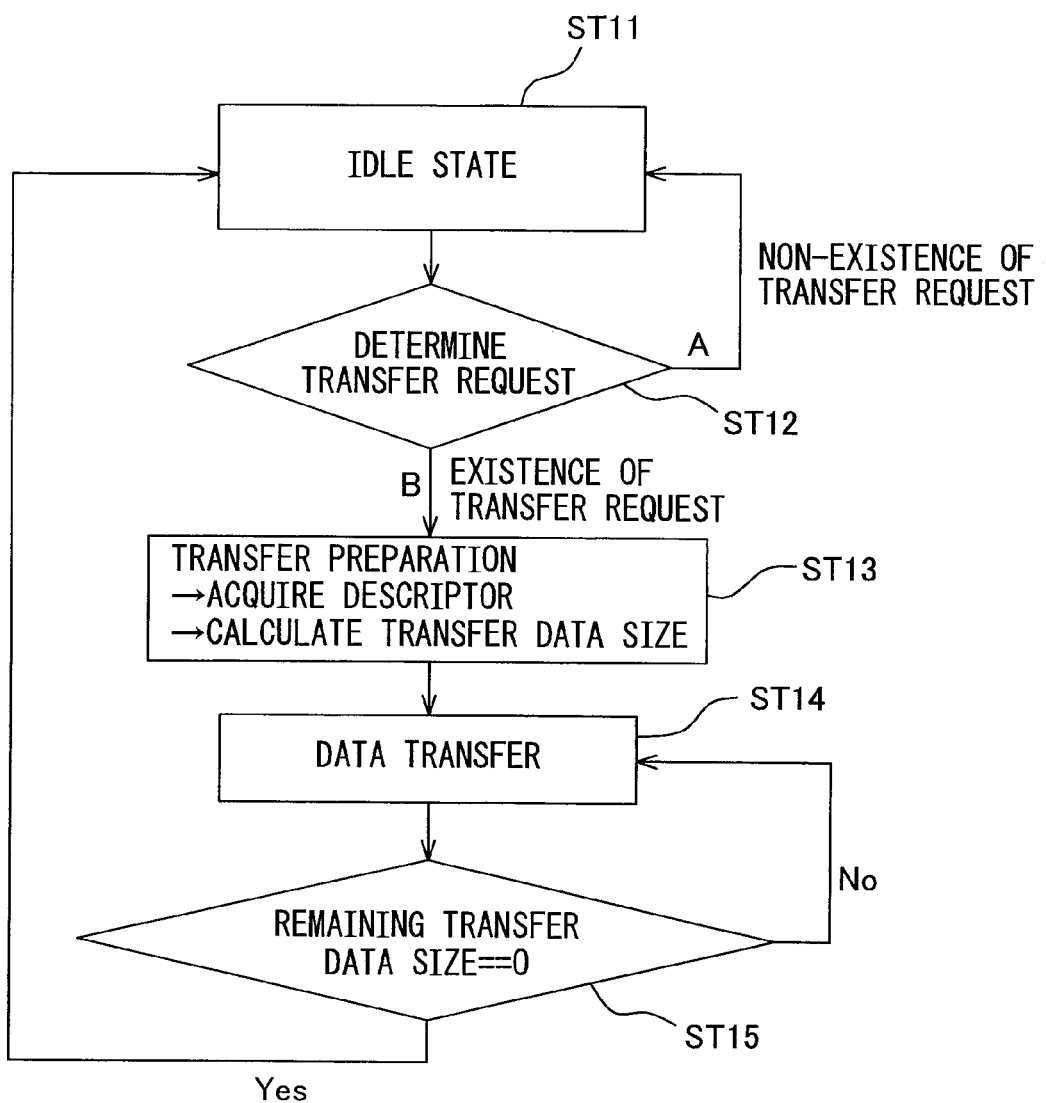
FIG. 14 is a block diagram for illustrating an example of processes at the time of no resource competition in a sub DMAC of a silicon on chip depicted in FIG. 13.

FIG. 14 is a block diagram for illustrating an example of processes at the time of no resource competition in a sub DMAC of a silicon on chip depicted in FIG. 13.

As depicted in FIG. 14, when there is no resource competition in the sub DMAC 4, the sub DMAC 4 recoveries from an idle state (ST11) and determines the transfer request (ST12).

When it is determined that there is no transfer request (ST12: A), the sub DMAC 4 returns to the idle state (ST11), and when it is determined that there is the transfer request (ST12: B), transfer preparation is made (ST13). A process of the transfer preparation in the step ST13 may be, for example, an acquisition of the descriptor 12a mentioned above and a calculation of the transfer data size.

When the transfer preparation has been completed, the data transfer (DMA transfer) is performed (ST14), and the data transfer is continued until the remaining transfer data size is equal to 0 (ST15: No and ST14). When the remaining transfer data size becomes 0 (ST15: Yes), the data transfer is finished and the sub DMAC 4 returns to the idle state (ST11).

The processes of the sub DMAC 4 depicted in FIG. 14 are performed by creating the dedicated codes for causing the processes of ST11 to ST15 to be performed, and loading the created codes to the instruction RAM 41. Next, processes at the time of resource competition in the sub DMAC will be illustrated.

Figure 15:
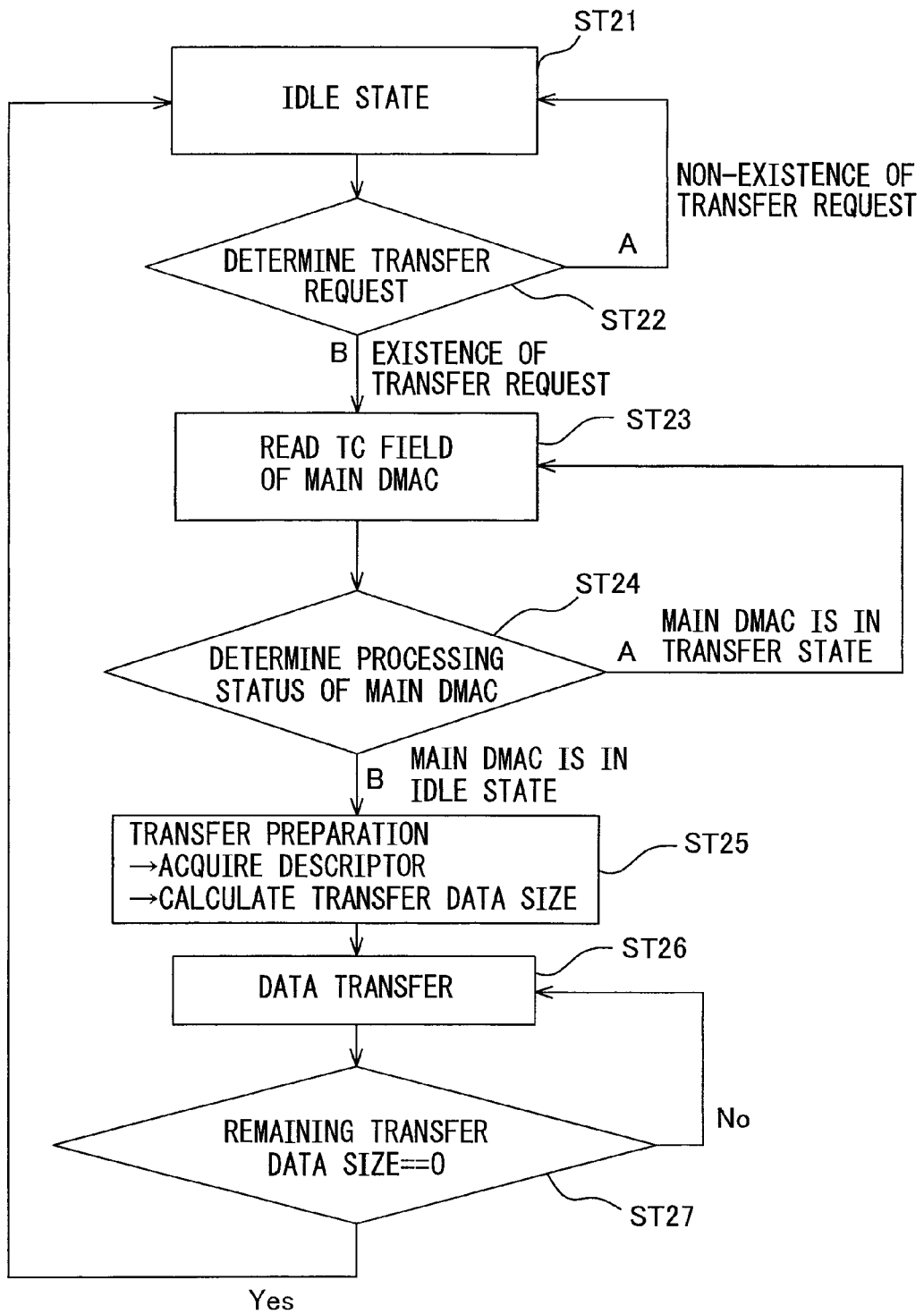
FIG. 15 is a block diagram for illustrating an example of processes at the time of resource competition in a sub DMAC of a silicon on chip depicted in FIG. 13.

FIG. 15 is a block diagram for illustrating an example of processes at the time of resource competition in a sub DMAC of a silicon on chip depicted in FIG. 13.

As depicted in FIG. 15, when there is resource competition in the sub DMAC 4, the sub DMAC 4 recoveries from the idle state (ST21) and determines the transfer request (ST22). When it is determined that there is no transfer request (ST22: A), the sub DMAC 4 returns to the idle state (ST21), and when it is determined that there is the transfer request (ST22: B), the TC field of the main DMAC 13 is read (ST23).

Furthermore, the process status of the main DMAC 13 is determined (ST24), and when it is determined that the main DMAC 13 is performing the transfer process (ST24: A), the TC field of the main DMAC 13 is read without performing a transfer by the sub DMAC 4 (ST23). It may be checked by the TC field of the main DMAC 13 whether or not the DMA transfer is being performed by the main DMAC 13.

When it is determined that the main DMAC 13 has completed the transfer process and is in the idle state (ST24: B), the transfer preparation is made (ST25). Furthermore, when the transfer preparation has been completed, the data transfer by the sub DMAC4 is performed (ST26), and the data transfer is continued until the remaining transfer data size is equal to 0 (ST27: No and ST26). When the remaining transfer data size becomes 0 (ST27: Yes), the data transfer is finished and the sub DMAC 4 returns to the idle state (ST21).

The processes ST21, ST22 and ST25 to ST27 in FIG. 15 correspond to the processes ST11, ST12 and ST13 to ST15 in FIG. 14. In other words, in FIG. 15, when the transfer process by the main DMAC 13 and the transfer process by the sub DMAC 5 conflict, the TC field of the main DMAC 13 is read (ST23), and the status of the transfer process of the main DMAC 13 is determined (ST24).

Still in other words, according to the present embodiment, a dedicated code is added for checking the status of the main DMAC 13, and it is made not to perform the DMA transfer by the sub DMAC 4, until the TC field is read and the DMA transfer of the main DMAC 13 is completed. Accordingly, it is possible to adjust the operation timing of the sub DMAC 4.

Figure 16:
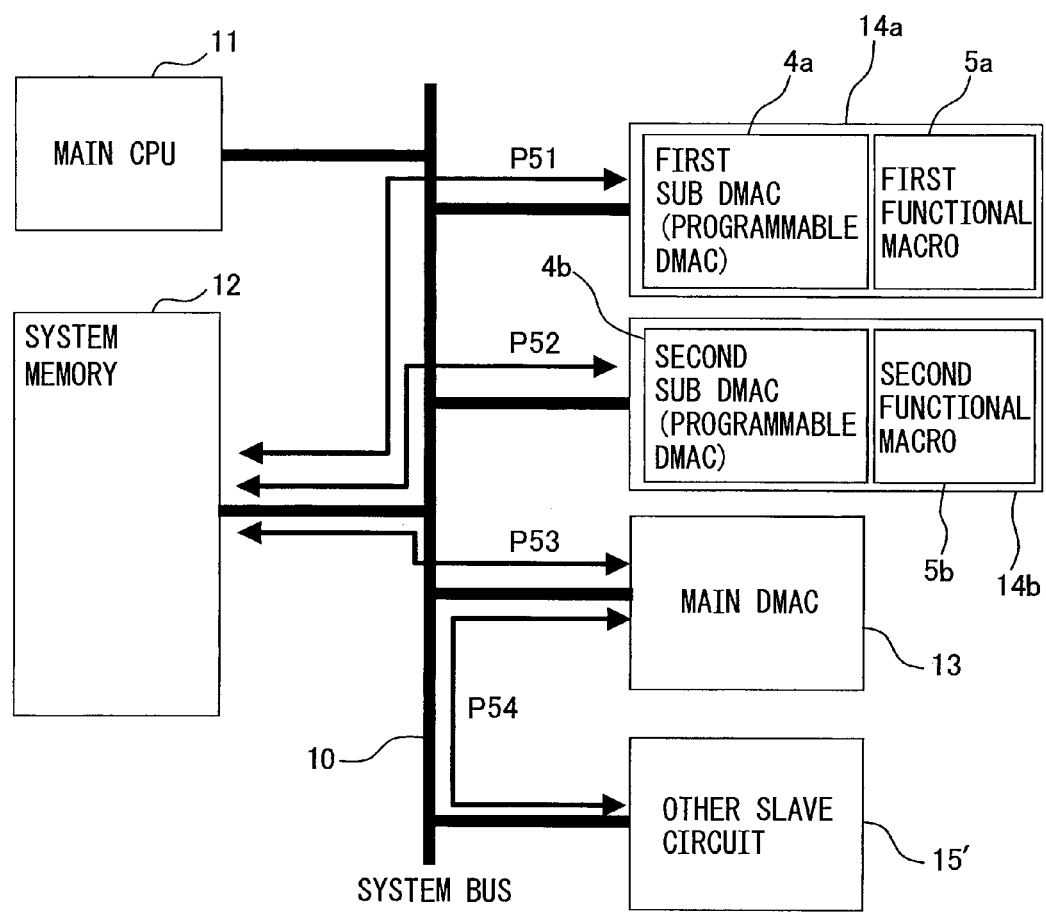
FIG. 16 is a block diagram for illustrating an example of a data transfer scheme in a modification of a silicon on chip of a first embodiment.

FIG. 16 is a block diagram for illustrating an example of a data transfer scheme in a modification of a silicon on chip of a first embodiment. FIG. 16 depicts a device provided with two functional blocks (14a, 14b) in which the sub DMACs 4a, 4b and the functional macros 5a, 5b are provided.

In other words, as is clear from a comparison between FIG. 16 and FIG. 13 mentioned above, the modification of the first embodiment depicted in FIG. 16 provides the two functional blocks, a first functional block 14a and a second functional block 14b. A first sub DMAC 4a is provided in the first functional block 14a, and a second sub DMAC 4b is provided in the second functional block 14b.

The first functional block 14a corresponds to, for example, the network block 14 in FIG. 7, and the second functional block 14b corresponds to, for example, the memory block (memory I/F) 15 in FIG. 7. It is needless to say that three or more functional blocks each including the sub DMAC and the functional macro may be provided. Note that other functional macros are included in other slave circuit 15' in FIG. 16.

In FIG. 16, a referential mark P51 depicts the DMA transfer process by the sub DMAC 4a, P52 depicts the DMA transfer process by the sub DMAC 4b, and P53 and P54 depict the DMA transfer process by the main DMAC 13.

Figure 17:
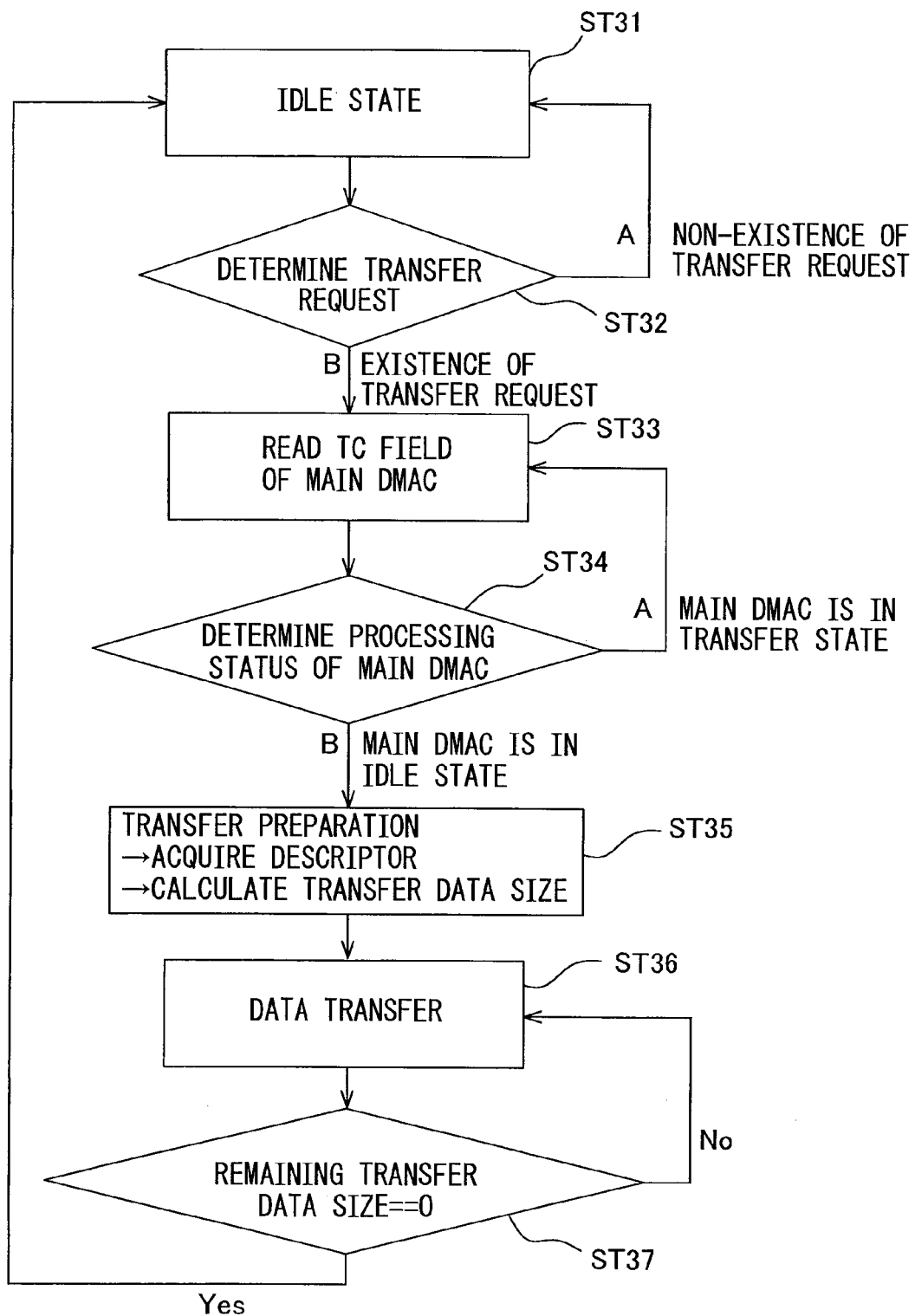
FIG. 17 is a flowchart depicting an example of processes at the time of resource competition in a first sub DMAC of a silicon on chip depicted in FIG. 16.

FIG. 17 is a flowchart depicting an example of processes at the time of resource competition in a first sub DMAC of a silicon on chip depicted in FIG. 16.

As is clear from a comparison between FIG. 17 and FIG. 15 mentioned above, the processes when there is resource competition in the first sub DMAC 4a are substantially same as the processes in FIG. 15. In other words, the processes ST31 to ST37 in FIG. 17 correspond to the processes ST21 to ST27 in FIG. 15, and the illustration for these processes are omitted.

Figure 18:
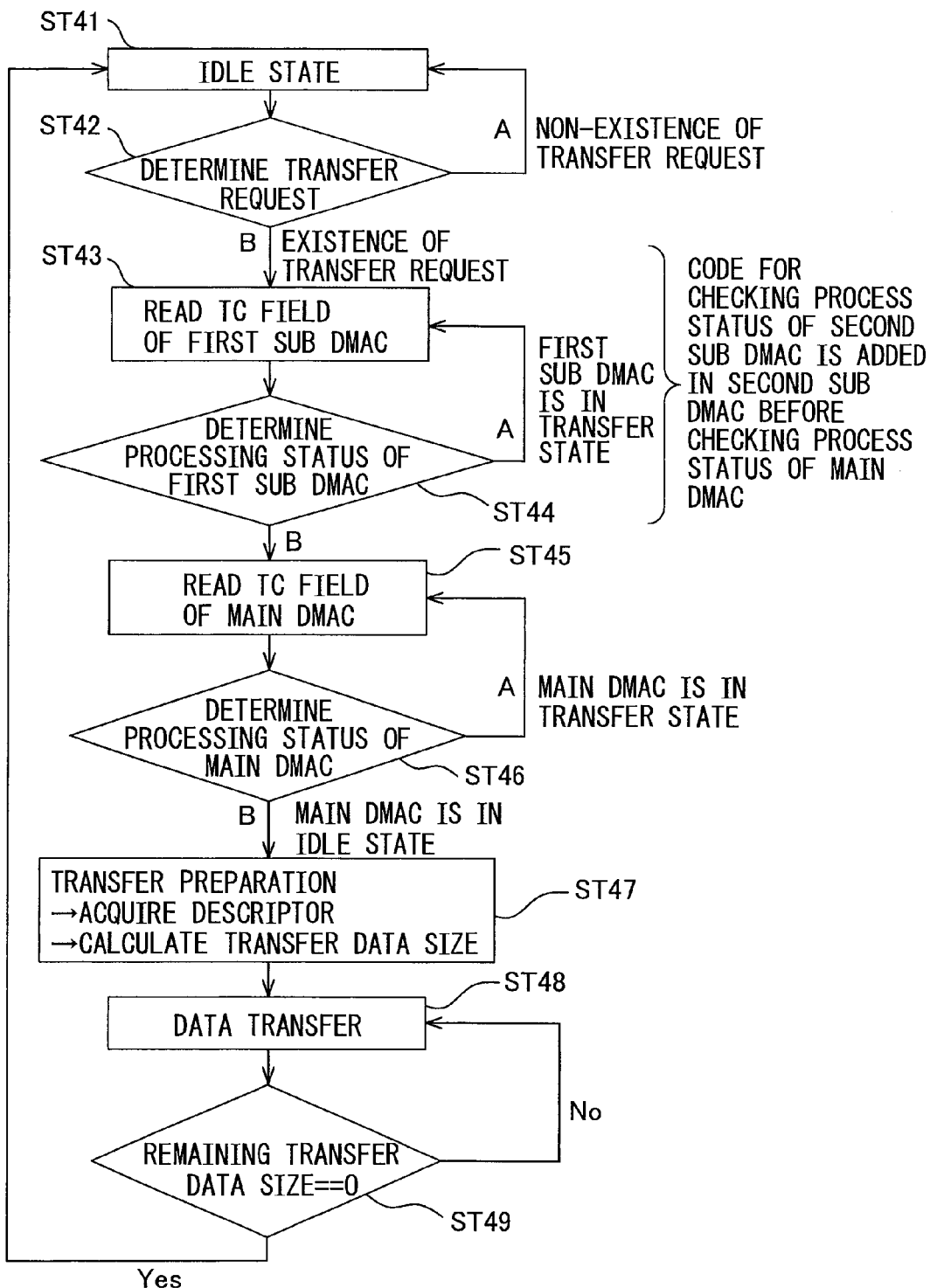
FIG. 18 is a flowchart depicting an example of processes at the time of resource competition in a second sub DMAC of a silicon on chip depicted in FIG. 16.

FIG. 18 is a flowchart depicting an example of processes at the time of resource competition in a second sub DMAC of a silicon on chip depicted in FIG. 16.

As depicted in FIG. 18, when there is resource competition in the second sub DMAC, the first sub DMAC 4a recoveries from an idle state (ST41) and determines the transfer request (ST42). When it is determined that there is no transfer request (ST42: A), the first sub DMAC 4a returns to the idle state (ST41), and when it is determined that there is the transfer request (ST42: B), the TC field of the first sub DMAC 4a is read (ST43).

Furthermore, the process status of the first sub DMAC 4a is determined (ST44), and when it is determined that the first sub DMAC 4a is performing the transfer process (ST44: A), the TC field of the first sub DMAC 4a is read without performing a transfer by the second sub DMAC 4b (ST43). It may be checked by the TC field of the first sub DMAC 4a whether or not the DMA transfer is being performed by the first sub DMAC 4a.

Note that, in the processes ST43 and ST44, a code (control code: command) for checking the process status of the second sub DMAC 4b is added in the second sub DMAC 4b before checking the process status of the main DMAC 13.

Next, when it is determined that the first sub DMAC 4a has completed the transfer process (ST44: B), the TC field of the main DMAC 13 is read (ST45), and the status of the transfer process of the main DMAC 13 is determined (ST46).

When it is determined that the main DMAC 13 has completed the transfer process and is in the idle state (ST46: B), the transfer preparation of the second sub DMAC 4b is made (ST47). Furthermore, when the transfer preparation has been completed, the data transfer by the second sub DMAC 4b is performed (ST48), and the data transfer is continued until the remaining transfer data size is equal to 0 (ST49: No and ST48). When the remaining transfer data size becomes 0 (ST49: Yes), the data transfer is finished and it returns to the idle state (ST41).

As mentioned above, according to the silicon on chip of the first embodiment, a hardware may be simplified and development cycle of the hardware may be shortened. Moreover, modification of the dedicated codes loaded to the instruction RAM 41 in the sub DMAC 4 allows a flexible modification for various QoS control systems.

Figure 19:
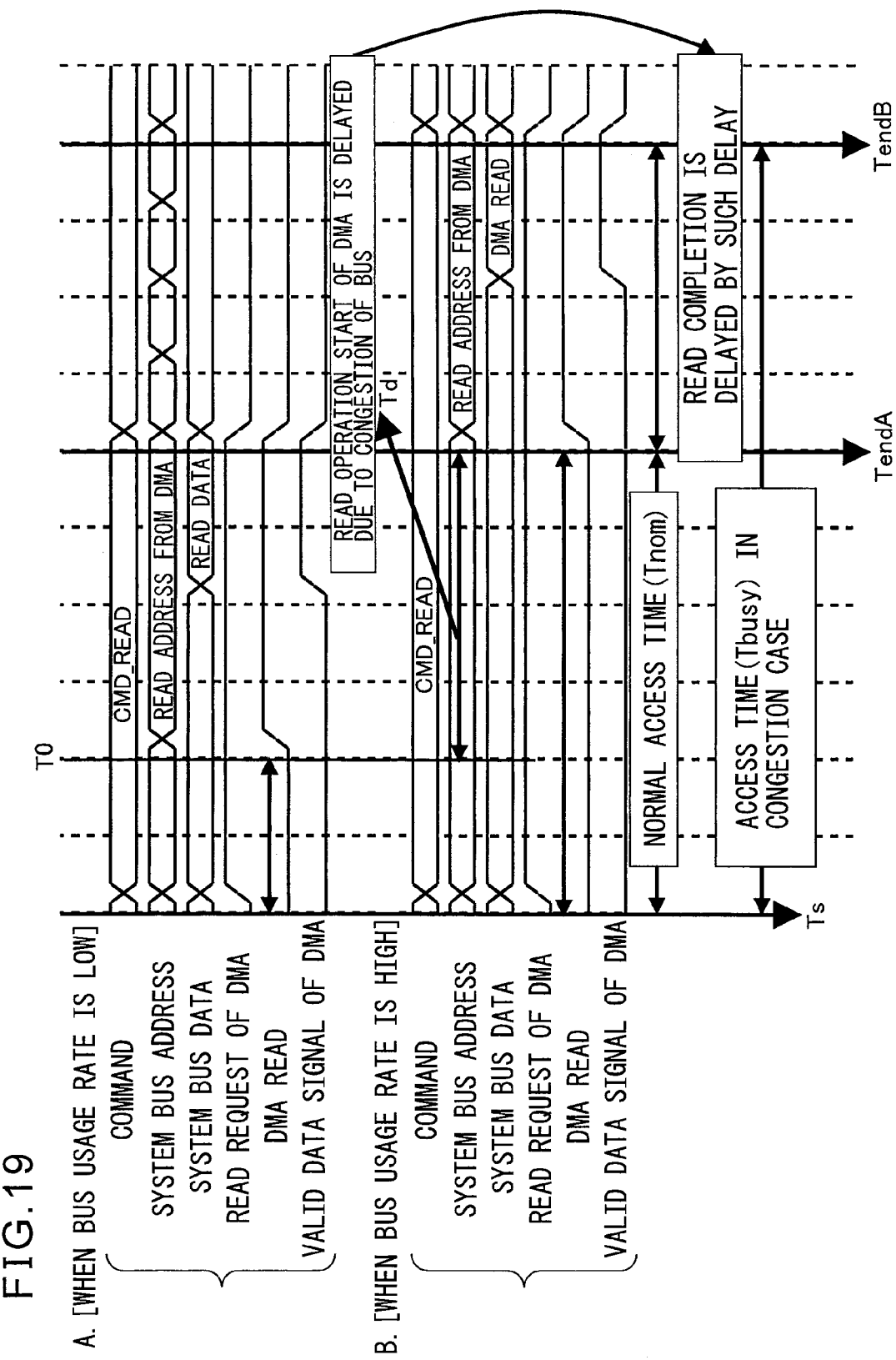
FIG. 19 is a timing chart for illustrating a relationship of a usage rate of a bus and a DMA transfer by a sub DMAC.

FIG. 19 is a timing chart for illustrating a relationship of a usage rate of a bus and a DMA transfer by a sub DMAC. An upper half of FIG. 19 depicts a case (A) when bus usage rate is low, and a lower half thereof depicts a case (B) when the bus usage rate is high.

When the bus usage rate is low (A) as depicted in the upper half of FIG. 19, DMA read is requested by the sub DMAC 4 in accordance with a command CMD READ at the timing Ts.

Accordingly, the address of the system bus 10 is used as a read address by the sub DMAC 4, for example, from the timing T0, and after that, the data of the system bus 10 is read data of DMA corresponding to the read address by the sub DMAC 4. Then, data read of DMA by the sub DMAC 4 is completed at timing TendA.

On the other hand, when the bus usage rate is high as depicted in the lower half of FIG. 19, at the timing Ts, the read of the DMA by the sub DMAC 4 is requested in accordance with the command CMD READ, but this is delayed Td due to congestion of the system bus 10.

This is because, for example, when the DMA transfer by the main DMAC 13, which has higher priority than the DMA transfer by the sub DMAC 4, continues, the DMA transfer by the sub DMAC 4 is performed in wait for finishing the process and releasing the system bus 10.

The address of the system bus 10 is used as the read address by the sub DMAC 4, for example, after the timing Ti at which the DMA transfer by the main DMAC 13 is finished. After that, the data of the system bus 10 is the read data of the DMA according to the read address by the sub DMAC 4, and data read is completed at timing TendB.

In this way, when the bus usage rate is low (A), the DMA transfer (read data transfer) by the sub DMAC 4 takes the normal access time (Tnom) which is from the timing Ts at which the reed (command CMD READ) of DMA is requested to the timing TendA at which the DMA transfer is completed.

On the other hand, when the bus usage rate is high (B), the DMA transfer by the sub DMAC 4 takes the access time (Tbusy) in a congestion case which is from the timing Ts at which the reed (command CMD READ) of DMA is requested to the timing TendB at which the DMA transfer is completed.

The data transfer scheme in the silicon on chip of the second embodiment utilizes that the access time varies, such as Tnom and Tbusy, due to loads of the system bus 10 to which the sub DMAC 4 mentioned above is connected.

The data transfer scheme in the silicon on chip of the second embodiment, for example, indirectly checks the above-mentioned access time using the timer embedded in the sub DMAC, and avoids the resource competition.

In other words, it accesses to the system bus side to check the load on the system bus, it is made not to perform the data transfer by the sub DMAC when the time for one access exceeds an expected cycle.

Figure 20:
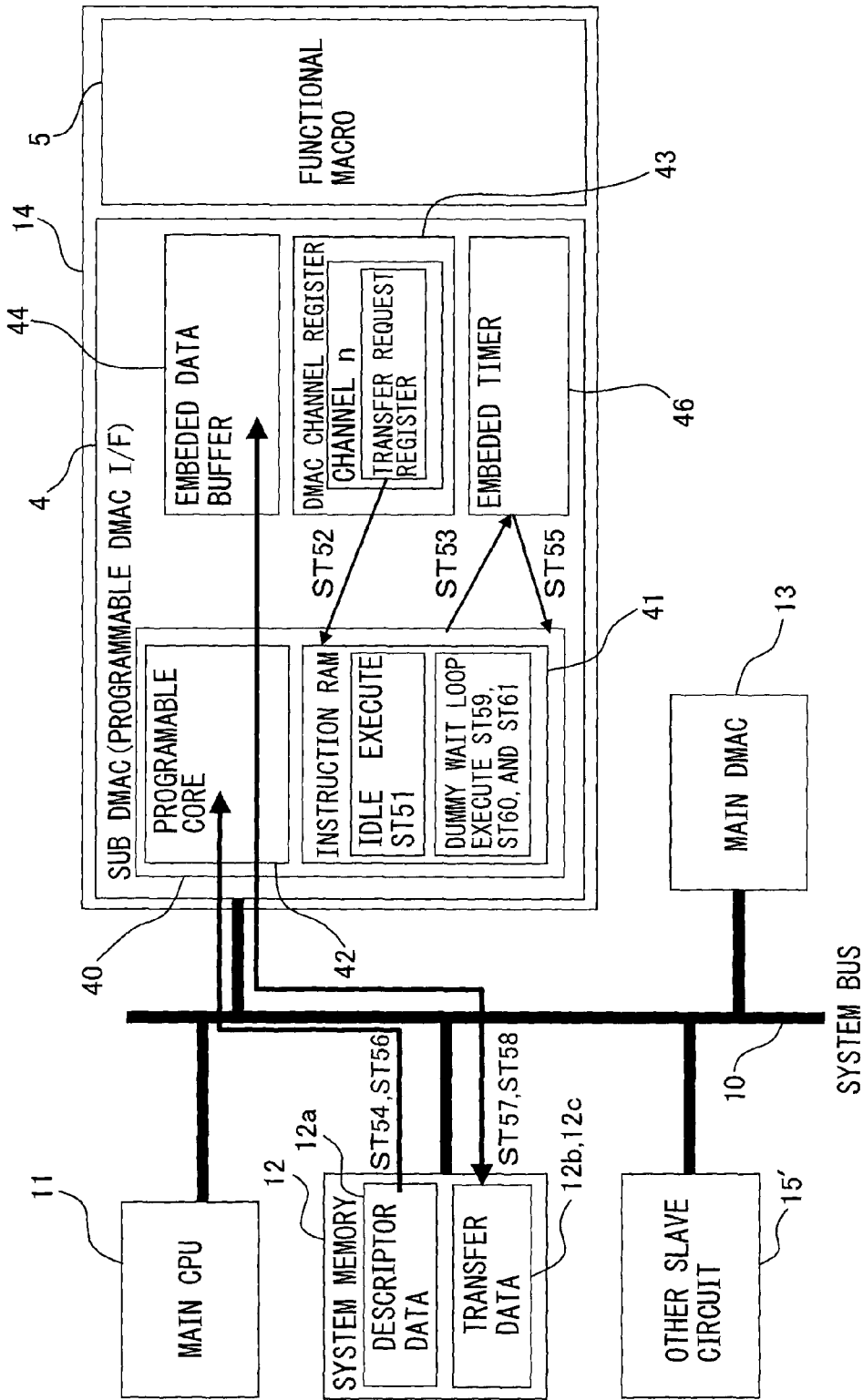
FIG. 20 is a block diagram depicting an example of a silicon on chip of a second embodiment.
Figure 21:
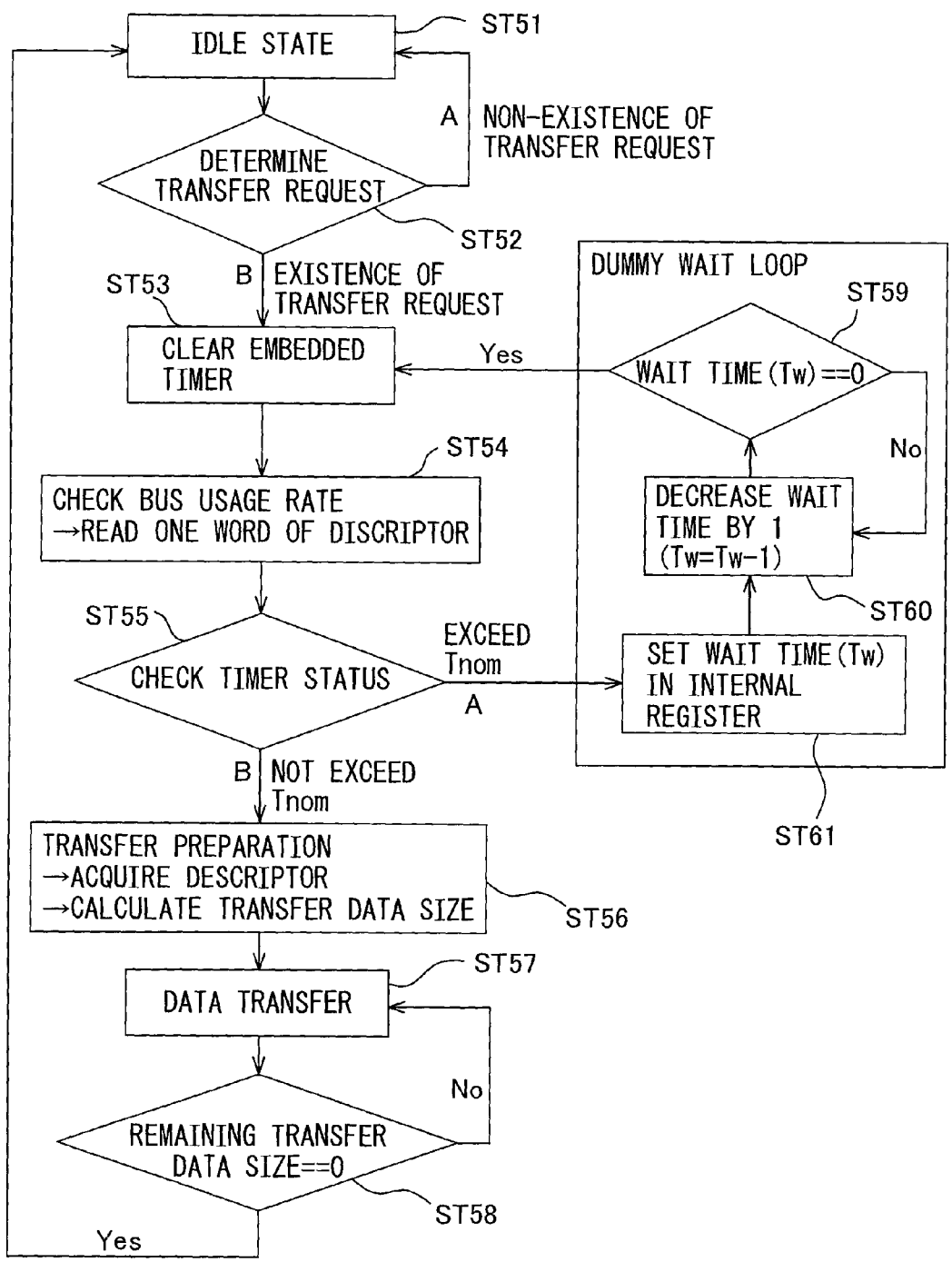
FIG. 21 is a flowchart for illustrating an example of processes at the time of resource competition in a sub DMAC of a silicon on chip depicted in FIG. 20.

FIG. 20 is a block diagram depicting an example of a silicon on chip of a second embodiment. FIG. 21 is a flowchart for illustrating an example of processes at the time of resource competition in a sub DMAC of a silicon on chip depicted in FIG. 20.

As depicted in FIG. 20, in the second embodiment, the sub DMAC 4 is connected to the functional macro 5, and includes the DMAC core 40, the DMAC channel register 43, the data buffer 44, and an embedded timer 46. Note that, in FIG. 20, the system bus interface 45 in FIG. 8 is omitted.

In other words, the sub DMAC 4 (DMAC core 40) of the second embodiment includes the timer 46, and performs the process at the time of the resource competition in the sub DMAC 4 using the timer 46.

The referential marks ST51 to ST61 in FIG. 20 correspond to the processes ST51 to ST61 in the flowchart of FIG. 21, and these processes are performed by the programmable core 42. In other words, the programmable core 42 performs the process ST51 as an idle of the instruction RAM 41, and performs the processes ST59 to ST61 as a dummy weight loop of the instruction RAM 41.

The programmable core 42 performs the process ST52 as data read from the DMAC channel register 43 to the instruction RAM 41, performs the process ST53 as an access to the embedded timer 46, and performs the process ST55 as a response from the embedded timer 46.

Furthermore, the programmable core 42 performs the processes ST54 and ST56 as a data read from the descriptor data 12a of the system memory 12. The programmable core 42 performs the processes ST57 and ST58 as the DMA data transfer between the transferred data 12b and 12c and the embedded data buffer 44.

As depicted in FIG. 20 and FIG. 21, when there is resource competition in the sub DMAC 4, the sub DMAC 4 recoveries from the idle state (ST51) and determines the transfer request (ST52).

As for the process of the transfer request, for example, the data from the transfer request register of the channel n in the DMAC channel register 43 is read into the instruction RAM 41, and the programmable core 42 determines the presence and absence of the transfer request. When it is determined that there is no transfer request (ST52: A), the sub DMAC 4 returns to the idle state (ST51), and when it is determined that there is the transfer request (ST52: B), the embedded timer is cleared (ST53).

In other words, using the instruction (control code) executed by the sub DMAC 4 clears the current value of the timer and restarts the timer. Specifically, this is realized by writing the normal access cycle as a threshold, into the timer provided in the channel module which is not used for the data transfer of the sub DMAC 4. In this way, as the timer (46), the timer embedded in the sub DMAC 4 may be used, but other timers may be used.

Furthermore, the sub DMAC 4 checks the bus usage rate (ST54). In other words, the descriptor 12a of the system memory 12 is read 1 word, and the status of the timer is checked (ST55).

In other words, in the process ST55, the time for the read and the expected access time are compared and determined, by clearing the timer just before starting read-out in the process ST53, and then checking the status of the timer after completing the read-out.

When it is determined that the status of the timer does not exceed Tnom (ST55: B), i.e. it is determined that the bus usage rate is low, for example, there is no resource competition by the main DMAC 13, the transfer preparation of the sub DMAC 4 is made (ST56). The transfer preparation of the DMA transfer by the sub DMAC 4 includes, for example, acquiring the descriptor 12a and calculating the transfer data size.

Furthermore, when the transfer preparation has been completed, the data transfer by the sub DMAC 4 is performed (ST58), and the data transfer is continued until the remaining transfer data size is equal to 0 (ST58: No and ST57). When the remaining transfer data size becomes 0 (ST58: Yes), the data transfer is finished and the sub DMAC 4 returns to the idle state (ST51).

On the other hand, when it is determined that the status of the timer exceeds Tnom (ST55: A), i.e. it is determined that the bus usage rate is high, for example, there is resource competition by the main DMAC 13, the wait time (Tw) is set to the internal register (ST61).

Furthermore, the wait time is decreased by one (ST60, Tw=Tw−1), and the wait time is decreased by one until the wait time is equal to 0 (ST59: No, ST60). When the wait time becomes 0 (ST59: Yes), the embedded timer is cleared and the processes (ST53 to ST58) are repeated in the same manner. In other words, after determining that the wait time is 0 (ST59: Yes), the bus usage rate is checked again (ST54) and the processes are performed.

In this way, enabling execution of the processed in the flowchart of FIG. 20 for example, by the control code (instruction) to be executed by the sub DMAC 4 allows a check of the status of the resource of the system bus 10 and a determination whether or not the data transfer is performed without any change of a hardware.

Figure 22:
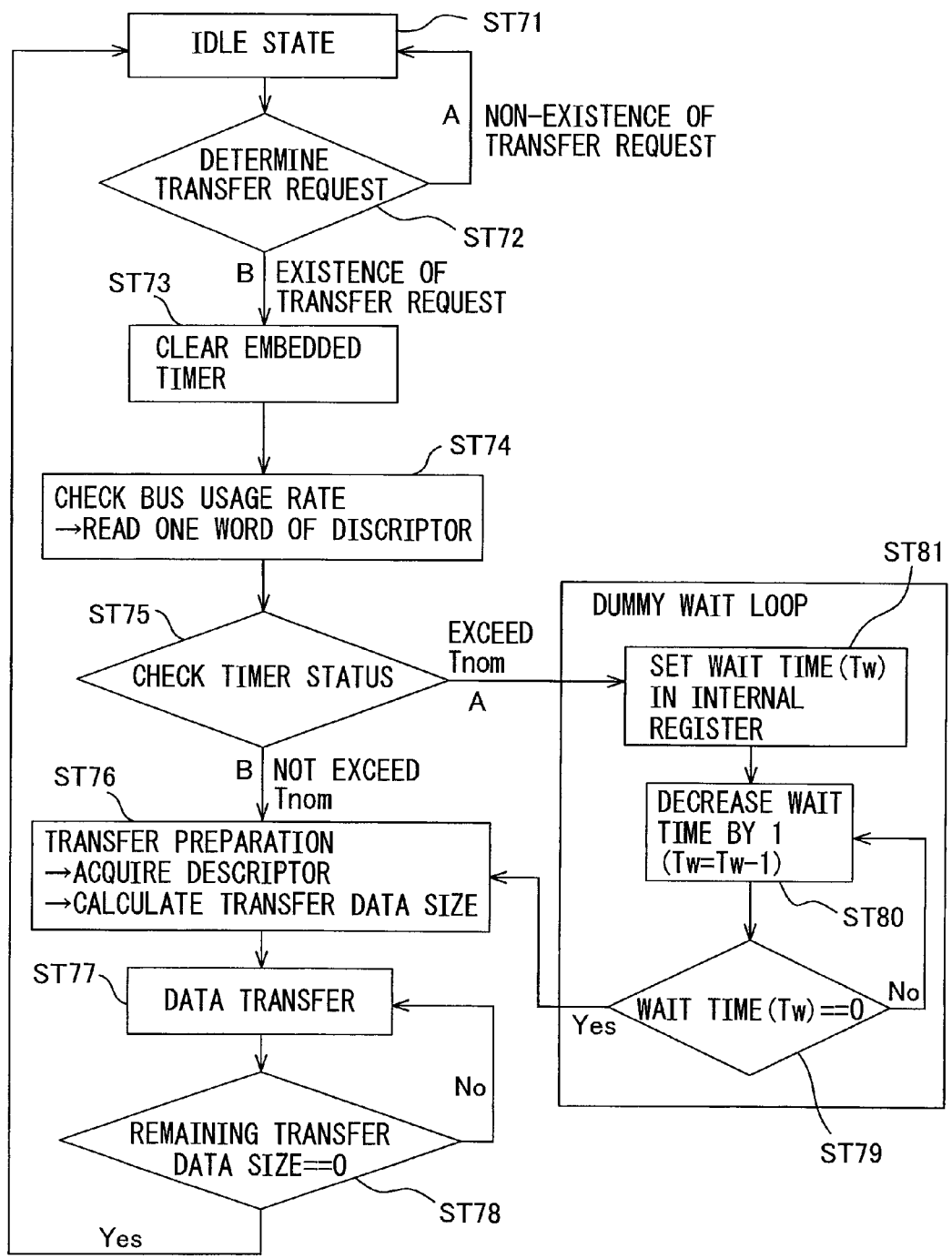
FIG. 22 is a flowchart for illustrating another example of processes at the time of resource competition in a sub DMAC of a silicon on chip depicted in FIG. 20.

FIG. 22 is a flowchart for illustrating another example of processes at the time of resource competition in a sub DMAC of a silicon on chip depicted in FIG. 20.

As is clear from a comparison between FIG. 22 and FIG. 21 mentioned above, the processes ST71 to ST78 in FIG. 22 correspond to the processes ST51 to ST58 in FIG. 21, and therefore the illustration for these processes are omitted.

When it is determined that the status of the timer exceeds Tnom (ST75: A), i.e. it is determined that the bus usage rate is high, for example, there is resource competition by the main DMAC 13, the wait time (Tw) is set to the internal register (ST81).

Furthermore, the wait time is decreased by one (ST80, Tw=Tw−1), and the wait time is decreased by one until the wait time is equal to 0 (ST79: No, S80). When the wait time becomes 0 (ST79: Yes), it is considered that the bus usage rate is low, for example, the resource competition by the main DMAC 13 is finished, and the transfer preparation of the sub DMAC 4 is made (ST76).

The transfer preparation of the DMA transfer by the sub DMAC 4 includes, for example, acquiring the descriptor 12a and calculating the transfer data size. Furthermore, when the transfer preparation has been completed, the data transfer by the sub DMAC 4 is performed (ST77), and the data transfer is continued until the remaining transfer data size is equal to 0 (ST78: No and ST57). When the remaining transfer data size becomes 0 (ST78: Yes), the data transfer is finished and it returns to the idle state (ST71).

In this way, the process at the time of the resource competition in the sub DMAC depicted in FIG. 22 determines that the resource competition is finished without performing the process (ST74) which checks the bus usage rate, when it is determined that the status of the timer exceeded Tnom (ST75: A).

Therefore, it would be possible to achieve a higher-speed processing than the example in FIG. 21, but when the setting value (estimated value) by the timer is not appropriate, the processes of the sub DMAC 4 and the main DMAC 13 will conflict. In this case, the conflict is solved by other processes, for example, an arbitration process by the main CPU 11.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A semiconductor integrated circuit comprising:
a bus;
a memory connected to the bus;
an arithmetic processing unit connected to the bus;
a first DMA controller connected to the bus; and
at least one functional block connected to the bus, the functional block including a functional macro which is configured to perform a process that realizes a given function, a second DMA controller which is configured to control data transfer between the memory and the functional macro, and an access condition setting circuit which is configured to set an access condition regarding the data transfer between the memory and the functional macro controlled by the second DMA controller, wherein the access condition setting circuit includes a first register and a control code storing circuit, the first register is configured to set the access condition including an address of the memory and transfer size in a unit of instruction, the control code storing circuit is configured to store a control code, at least one of the first register and the control code storing circuit is further configured to set an address of a second register in the first DMA controller, and the second register is configured to set status information of the first DMA controller, and the second DMA controller is configured to control an access to the memory by the second DMA controller by determining whether the first DMA controller is performing transfer process or is in an idle state in accordance with the status information of the first DMA controller read from the second register by using the address of the second register, the access condition in the first register set in the unit of instruction, and the control code stored in the control code storing circuit, when an access to the memory conflicts with an access by the first DMA controller.

2. The semiconductor integrated circuit as claimed in claim 1, wherein
the control code storing circuit is an instruction memory provided in the second DMA controller, and
a control code which defines the access condition set in the unit of instruction is written in the instruction memory at the time of initial setting.

3. The semiconductor integrated circuit as claimed in claim 2, wherein
the control code is written in the instruction memory by the arithmetic processing unit at the time of power on.

4. The semiconductor integrated circuit as claimed in claim 1, wherein
the status information of the first DMA controller includes data size field of the data transfer controlled by the first DMA controller.

5. The semiconductor integrated circuit as claimed in claim 1, wherein
the at least one functional block includes:
a plurality of the second DMA controllers that are configured to control data transfer between the memory and the functional macro;
a first functional block including one of the plurality of the second DMA controllers; and
a second functional block including another of the plurality of the second DMA controllers.

6. The semiconductor integrated circuit as claimed in claim 5, wherein
the second DMA controller of the first functional block, when an access to the memory conflicts with an access by the second DMA controller of the second functional block, checks a process status of the second DMA controller of the second functional block to control the access by the second DMA controller of the second functional block.

7. The semiconductor integrated circuit as claimed in claim 1, wherein
the at least one functional block comprises:
a third functional block including the second DMA controller which is configured to control data transfer between the memory and the functional macro; and
a fourth functional block not including the second DMA controller.

8. The semiconductor integrated circuit as claimed in claim 1, wherein
after the semiconductor integrated circuit is applied to a product, the data stored in the access condition setting circuit is rewritten to change the access condition regarding the data transfer between the memory and the functional macro controlled by the second DMA controller.

9. A DMA control method for a semiconductor integrated circuit which includes:
a bus;
a memory connected to the bus;
an arithmetic processing unit connected to the bus;
a first DMA controller connected to the bus; and
at least one functional block connected to the bus, the functional block including a functional macro which is configured to perform a process that realizes a given function, a second DMA controller which is configured to control data transfer between the memory and the functional macro, and an access condition setting circuit which is configured to set an access condition regarding the data transfer between the memory and the functional macro controlled by the second DMA controller, wherein the access condition setting circuit includes a first register and a control code storing circuit, the first register is configured to set the access condition including an address of the memory and transfer size in a unit of instruction, the control code storing circuit is configured to store a control code, at least one of the first register and the control code storing circuit is further configured to set an address of a second register in the first DMA controller, and the second register is configured to set status information of the first DMA controller, and the second DMA controller is configured to control an access to the memory by the second DMA controller by determining whether the first DMA controller is performing transfer process or is in an idle state in accordance with the status information of the first DMA controller read from the second register by using the address of the second register, the access condition in the first register set in the unit of instruction, and the control code stored in the control code storing circuit, when an access to the memory conflicts with an access by the first DMA controller, wherein the DMA control method comprising:
when the access to the memory conflicts with the access by the first DMA controller,
checking a state of data transfer controlled by the first DMA controller on the basis of the status information of the first DMA controller read from the second register by using the address of the second register; and
controlling an access to the memory by the second DMA controller on the basis of a result of the checking or the estimating.

* * * * *